US010980790B2

(12) United States Patent
Nause

(10) Patent No.: US 10,980,790 B2
(45) Date of Patent: Apr. 20, 2021

(54) DOSAGE FORMS OF APIXABAN

(71) Applicants: Pfizer Inc., New York, NY (US); Bristol-Myers Squibb Company, Princeton, NJ (US)

(72) Inventor: Richard G. Nause, Morristown, NJ (US)

(73) Assignees: PFIZER INC., New York, NY (US); BRISTOL-MYERS SQUIBB COMPANY, Princeton, NJ (US)

(*) Notice: Subject to any disclaimer, the term of this patent is extended or adjusted under 35 U.S.C. 154(b) by 0 days.

(21) Appl. No.: 15/474,296

(22) Filed: Mar. 30, 2017

(65) Prior Publication Data

US 2017/0202826 A1 Jul. 20, 2017

Related U.S. Application Data

(63) Continuation of application No. 14/281,041, filed on May 19, 2014, now abandoned, which is a continuation of application No. 13/933,718, filed on Jul. 2, 2013, now abandoned, which is a continuation of application No. 13/378,236, filed as application No. PCT/US2010/038660 on Jun. 15, 2010, now abandoned.

(60) Provisional application No. 61/187,442, filed on Jun. 16, 2009.

(51) Int. Cl.
*A61K 31/4545* (2006.01)
*A61K 9/20* (2006.01)
*A61K 9/48* (2006.01)
*A61K 9/16* (2006.01)
*C07D 471/14* (2006.01)
*A61K 9/00* (2006.01)
*A61P 7/02* (2006.01)
*A61K 31/437* (2006.01)
*A61K 47/38* (2006.01)

(52) U.S. Cl.
CPC ........ *A61K 31/4545* (2013.01); *A61K 9/0004* (2013.01); *A61K 9/1641* (2013.01); *A61K 9/1652* (2013.01); *A61K 9/2031* (2013.01); *A61K 9/2054* (2013.01); *A61K 9/2086* (2013.01); *A61K 9/48* (2013.01); *A61K 31/437* (2013.01); *A61K 47/38* (2013.01); *A61P 7/02* (2018.01)

(58) Field of Classification Search
USPC ....................................................... 424/465
See application file for complete search history.

(56) References Cited

U.S. PATENT DOCUMENTS 3,845,770 A 11/1974 Theeuwes et al.
3,995,631 A 12/1976 Higuchi et al.
4,203,440 A 5/1980 Theeuwes
4,247,498 A 1/1981 Castro
4,490,431 A 12/1984 Vitzthum et al.
4,612,008 A 9/1986 Wong et al.
4,627,850 A 12/1986 Deters et al.
4,672,850 A 6/1987 Konersmann
4,673,564 A 6/1987 Kawata et al.
4,744,906 A 5/1988 Gerlach et al.
4,894,235 A 1/1990 Koehne et al.
5,120,548 A 6/1992 McClelland et al.
5,134,127 A 7/1992 Stella et al.
5,145,684 A 9/1992 Liversidge et al.
5,225,192 A 7/1993 Lovrecich
5,324,280 A 6/1994 Wong et al.
5,340,591 A 8/1994 Nakano et al.
5,376,645 A 12/1994 Stella et al.
5,456,923 A 10/1995 Nakamichi et al.
5,458,887 A 10/1995 Chen et al.
5,612,059 A 3/1997 Cardinal et al.
5,612,359 A 3/1997 Murugesan
5,654,005 A 8/1997 Chen et al.
5,686,133 A 11/1997 Amidon et al.
5,698,220 A 12/1997 Cardinal et al.
5,707,646 A 1/1998 Yajima et al.
5,798,119 A 8/1998 Herbig et al.
5,834,022 A 11/1998 Amidon et al.
5,851,275 A 12/1998 Amidon et al.
5,858,410 A 1/1999 Muller et al.
5,874,418 A 2/1999 Stella et al.
5,939,099 A 8/1999 Grabowski et al.
5,993,858 A 11/1999 Crison et al.
6,042,847 A 3/2000 Kerc et al.

(Continued)

FOREIGN PATENT DOCUMENTS

EP 0 028 489 A1 5/1981
EP 0 378 404 A2 7/1990

(Continued)

OTHER PUBLICATIONS

Frangois Hallouard et al., "Solid Dispersions for Oral Administration: An Overview of the Methods for Their Preparation," 22 Curr. Pharm. Des. 1-17 (Jul. 2016).
Win Loung Chiou et al., "Pharmaceutical Applications of Solid Dispersion Systems," 60(9) J. Pharm. Sci. 1281-1302 (Sep. 1971).
Feng Qian et al., "Drug-Polymer Solubility and Miscibility: Stability Consideration and Practical Challenges in Amorphous Solid Dispersion Development," 99(7) J. Pharm. Sci. 2941-2947 (Jul. 2010).
Frank Theil et al., "Manufacturing Amorphous Solid Dispersions with a Tailored Amount of Crystallized API for Biopharmaceutical Testing," 15(5) Mol. Pharm. 1870-1877 (Apr. 2018).

(Continued)

*Primary Examiner* — Abigail Vanhorn
*Assistant Examiner* — Mei Ping Chui
(74) *Attorney, Agent, or Firm* — Venable LLP

(57) ABSTRACT

The present invention relates to a Factor Xa inhibitor dosage form comprising a solid amorphous dispersion comprising an amorphous apixaban and a polymer, and methods for preventing or treating venous thromboembolisms, deep vein thrombosis and acute coronary syndrome with said dosage form.

41 Claims, 9 Drawing Sheets

(56) References Cited

U.S. PATENT DOCUMENTS

| | | | |
|---|---|---|---|
| 6,043,265 A | 3/2000 | Murugesan et al. | |
| 6,046,177 A | 4/2000 | Stella et al. | |
| 6,054,136 A | 4/2000 | Farah et al. | |
| 6,096,338 A | 8/2000 | Lacy et al. | |
| 6,197,349 B1 | 3/2001 | Westesen et al. | |
| 6,342,249 B1 | 1/2002 | Wong et al. | |
| 6,419,952 B2 | 7/2002 | Wong et al. | |
| 6,636,226 B2 | 10/2003 | Morein et al. | |
| 6,706,283 B1 * | 3/2004 | Appel | A61K 9/0004 424/464 |
| 6,763,607 B2 | 7/2004 | Beyerinck et al. | |
| 6,962,931 B2 | 11/2005 | Gumkowski et al. | |
| 6,967,208 B2 | 11/2005 | Pinto et al. | |
| 7,115,279 B2 | 10/2006 | Curatolo et al. | |
| 7,235,259 B2 | 6/2007 | Crew et al. | |
| 7,396,932 B2 | 7/2008 | Shapiro et al. | |
| 7,550,158 B2 | 6/2009 | Appel et al. | |
| 7,887,840 B2 | 2/2011 | Curatolo et al. | |
| 8,026,286 B2 | 9/2011 | Curatolo et al. | |
| 2002/0006443 A1 | 1/2002 | Curatolo et al. | |
| 2003/0054037 A1 | 3/2003 | Babcock et al. | |
| 2003/0054038 A1 | 3/2003 | Crew et al. | |
| 2003/0072801 A1 | 4/2003 | Curatolo et al. | |
| 2003/0085893 A1 | 5/2003 | Morein et al. | |
| 2003/0091643 A1 | 5/2003 | Friesen et al. | |
| 2003/0104063 A1 | 6/2003 | Babcock et al. | |
| 2003/0175346 A1 | 9/2003 | Billotte et al. | |
| 2003/0198674 A1 * | 10/2003 | Curatolo | A61K 9/0004 424/468 |
| 2007/0191306 A1 * | 8/2007 | Nassar | A61K 9/0019 514/58 |
| 2007/0259913 A1 * | 11/2007 | Deitchman | A61K 31/4545 514/303 |
| 2009/0011024 A1 | 1/2009 | Babcock et al. | |
| 2011/0045028 A1 | 2/2011 | Iinuma et al. | |
| 2012/0295988 A1 | 11/2012 | Babcock et al. | |

FOREIGN PATENT DOCUMENTS

| | | |
|---|---|---|
| EP | 1 027 887 A2 | 8/2000 |
| JP | 2000-229846 A | 8/2000 |
| JP | 2000-229888 A | 8/2000 |
| JP | 2005-500313 A | 1/2005 |
| WO | 00/01389 A1 | 1/2000 |
| WO | 00/59506 A1 | 10/2000 |
| WO | 01/40231 A1 | 6/2001 |
| WO | 2005011634 A1 | 2/2005 |
| WO | 2006/013542 A2 | 2/2006 |
| WO | 2006/079474 A1 | 8/2006 |
| WO | 2006/135425 A2 | 12/2006 |
| WO | 2007/001385 A2 | 1/2007 |
| WO | 2007/022165 A2 | 2/2007 |
| WO | 2008/031782 A1 | 3/2008 |
| WO | WO-2008031782 A1 * | 3/2008 ........... A61K 9/2846 |
| WO | 2008/066102 A1 | 6/2008 |

OTHER PUBLICATIONS

Henning H. Blume et al., "The Biopharmaceutics Classification System (BCS): Class III Drugs—Better Candidates for BA/BE Waiver?" 9 Eur. J. Pharm. Sci. 117-121 (1999).

Gordon L. Amidon et al., "A Theoretical Basis for a Biopharmaceutic Drug Classification: The Correlation of in Vitro Drug Product Dissolution and in Vivo Bioavailability," 12(3) Pharm. Res. 413-420 (1995).

Clinical Pharmacology/Biopharmaceutics Review(s) (http://www.accessdata.fda.gov/drugsatfda_docs/nda/2012/202155Orig1s000ClinPharmR.pdf), pp. 1-220 (dated Feb. 2012).

Perry's Chemical Engineers' Handbook, pp. 20-54-20-57 (Sixth Edition 1984).

Examination Report in New Zealand Application No. 596618 (dated Oct. 9, 2012).

Communication pursuant to Rules 161 and 162 EPC in European Application 10727611.5 (dated Jan. 25, 2012).

International Search Report in PCT/US2010/038660 (dated Sep. 22, 2010).

International Preliminary Report on Patentability with Written Opinion in PCT/US2010/038660 (dated Dec. 16, 2011).

First Examination Report in Australian Application No. 2010260208 (dated Feb. 17, 2014).

Notification of Reasons for Refusal in Japanese Application No. 2012-516197 (dated Jul. 1, 2014).

Second Examination Report in Australian Application No. 2010260208 (dated May 20, 2014).

Communication pursuant to Article 94(3) EPC in European Application No. 10727611.5 (dated Jun. 23, 2016).

Extended European Search Report in European Application No. 19158695.7 (dated Jul. 8, 2019).

* cited by examiner

DOSAGE FORMS OF APIXABAN

CROSS REFERENCE TO RELATED APPLICATIONS

This application is a continuation of application Ser. No. 14/281,041, filed May 19, 2014, which is a continuation of application Ser. No. 13/933,718, filed Jul. 2, 2013, now abandoned, which is a continuation of application Ser. No. 13/378,236, now abandoned, which was the National Stage of International Application No. PCT/US2010/038660, filed Jun. 15, 2010, which claims the benefit of Provisional Application No. 61/187,442, filed Jun. 16, 2009. International Application No. PCT/US2010/038660 and Application Ser. No. 13/933,718 are incorporated by reference herein in their entirety.

BACKGROUND OF THE INVENTION

The present invention relates to a Factor Xa inhibitor dosage form comprising Apixaban in a solubility-improved form wherein the dosage form provides controlled release of Apixaban and methods for preventing or treating venous thromboembolisms, deep vein thrombosis and acute coronary syndrome with said dosage form.

Activated Factor Xa, whose major practical role is the generation of thrombin by the limited proteolysis of prothrombin, holds a central position that links the intrinsic and extrinsic activation mechanisms in the final common pathway of blood coagulation. The generation of thrombin, the final serine protease in the pathway to generate a fibrin clot, from its precursor is amplified by formation of prothrombinase complex (Factor Xa, Factor V, Ca2+ and phospholipid). Since it is calculated that one molecule of Factor Xa can generate 138 molecules of thrombin inhibition, Factor Xa may be more efficient than inactivation of thrombin in interrupting the blood coagulation system. Accordingly, Factor Xa inhibitors are a class of compounds that are efficacious for the treatment of thromboembolic disorders.

U.S. Pat. No. 6,967,208 (hereby incorporated by reference) discloses a series of Factor Xa inhibitors including 1H-Pyrazolo[3,4-c]pyridine-3-carboxamide,4,5,6,7-tetrahydro-1-(4-methoxyphenyl)-7-oxo-6-[4-(2-oxo-1-piperidinyl)phenyl]-; alternatively named as 1-(4-methoxyphenyl)-7-oxo-6-[4-(2-oxopiperidin-1-yl)phenyl]-4,5,6,7-tetrahydro-1H-pyrazolo[3,4-c]pyridine-3-carboxamide (hereinafter referred to as apixaban). The structure of apixaban is

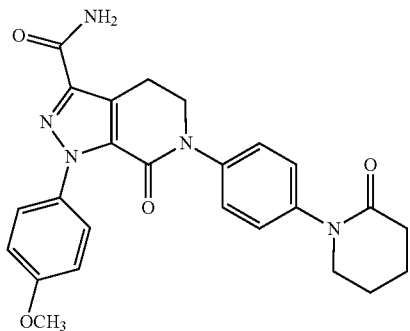

U.S. Pat. No. 6,967,208 discloses that the compounds of the invention may be administered in the form of a pharmaceutical composition comprising at least one of the compounds, together with a pharmaceutically acceptable vehicle, diluent, or carrier. For oral administration a pharmaceutical composition can take the form of solutions, suspensions, tablets, pills, capsules, powders and the like. Apixaban has been provided as a twice daily administration. WO 2007/022165 discloses an injectable Factor Xa (e.g., apixaban) formulation. WO 2006079474 and WO2008066102 disclose sustained release Factor Xa inhibitor formulations. WO2008031782 discloses modified release Formulations of Factor Xa inhibitors. Further pharmaceutical dosage forms are described in EP 1653926.

There is a continuing need to find safe, effective methods of delivering Factor Xa inhibitors including apixaban.

SUMMARY OF INVENTION

The present invention is directed to a solubility-improved form of apixaban wherein the dosage form provides controlled release of apixaban, designated the A dosage form.

A preferred aspect of the A dosage form is a controlled release dosage form that releases in vivo or in vitro 70 wt % of apixaban over 2 hours or more after administration of the dosage form to an aqueous environment of use.

Another preferred aspect of the A dosage form, designated the B dosage form, is an osmotic controlled release dosage form.

A preferred aspect of the B dosage form, designated the C dosage form, is a bilayer osmotic controlled release dosage form.

Another preferred aspect of the A dosage form is a dosage form wherein following administration to an in vivo use environment, the dosage form provides a plasma concentration of apixaban of about 70 ng/mL or more for a period of about 12 hours or more.

Yet another preferred aspect of the A dosage form is a dosage form wherein the solubility-improved form is selected from the group consisting of a solid amorphous dispersion, lipid vehicle comprising apixaban, a solid adsorbate comprising apixaban adsorbed onto a substrate, nanoparticles, adsorbates of apixaban in a crosslinked polymer, a nanosuspension, a supercooled form, an apixaban/cyclodextrin drug form, a softgel form, a self-emulsifying form, a three-phase apixaban form, a crystalline highly soluble form, a high-energy crystalline form, a hydrate or solvate crystalline form, an amorphous form, a mixture of apixaban and a solubilizing agent, and a solution of apixaban dissolved in a liquid.

Yet another preferred aspect of the A dosage form, designated the D dosage form is a dosage form wherein said solubility-improved form is a solid amorphous dispersion comprising apixaban and a polymer.

A preferred aspect of the D dosage form is a dosage form wherein the solid amorphous dispersion is a spray-dried dispersion.

A preferred aspect form of the C dosage form, designated the E dosage form, is a dosage form wherein the osmotic controlled release dosage form comprises a solid amorphous dispersion comprising apixaban and a polymer.

A preferred aspect of the E dosage form, designated the F dosage form, is a dosage form wherein the solid amorphous dispersion comprising apixaban and a polymer is a spray-dried dispersion.

A preferred aspect of the F dosage form, designated the G dosage form, is a dosage form wherein the osmotic controlled release dosage form comprises a bilayer tablet comprising an orifice.

A preferred aspect of the G dosage form is a dosage form wherein following administration to an in vivo use environment, the dosage form provides a plasma concentration of apixaban of about 70 ng/mL or more for a period of about 12 hours or more.

Yet another preferred aspect of the A dosage form, designated the H dosage form, is a dosage form wherein the controlled release dosage form is a matrix controlled release dosage form.

A preferred aspect of the H dosage form is a dosage form wherein the matrix controlled release dosage form comprises a solid amorphous dispersion comprising apixaban and a polymer and the solid amorphous dispersion is a spray-dried dispersion.

A preferred aspect of the A dosage form is a dosage form having an in-vitro dissolution rate, wherein the in-vitro dissolution rate is wherein less than about 10 wt % apixaban is released by one hour, about 20 wt % apixaban to about 40 wt % apixaban is released by four hours, about 60 wt % apixaban to about 80 wt % apixaban is released at about eight hours, and more than about 70 wt % apixaban is released at ten hours.

A preferred aspect of the A dosage form is a dosage form having an in-vitro dissolution rate, wherein the in-vitro dissolution rate is wherein less than about 20 wt % apixaban is released by one hour, about 20 wt % apixaban to about 40 wt % apixaban is released by two hours, about 50 wt % apixaban to about 75 wt % apixaban is released at about four hours, and more than about 70 wt % apixaban is released at six hours.

Yet another preferred aspect of the A dosage form is a dosage form having an average release rate, wherein the average release rate of apixaban is from about 7 wt %/hr to about 10 wt %/hr.

Yet another preferred aspect of the A dosage form is a dosage form having an average release rate, wherein the average release rate of apixaban is from about 11 wt %/hr to about 18 wt %/hr.

Yet another aspect of this invention is a method for treating thromboembolic disorders comprising administering to a mammal in need of treatment any of the above dosage forms.

Preferred thromboembolic disorders are venous thromboembolism, deep vein thrombosis, acute coronary syndrome and arterial thrombosis.

By controlled release is meant broadly that apixaban is released at a rate that is slower than immediate release. Controlled release is intended to embrace sustained release, delayed release and immediate release followed by sustained release. Controlled release of apixaban may be accomplished by any means known in the pharmaceutical arts, including use of osmotic controlled-release devices, matrix controlled-release devices, and multiparticulate controlled-release devices.

The solubility-improved form of apixaban is any form that is capable of supersaturating, at least temporarily, in an aqueous use environment by a factor of about 1.25-fold or more, relative to the solubility of crystalline apixaban. That is, the solubility-improved form provides a maximum dissolved drug concentration (MDC) of apixaban in a use environment that is at least 1.25-fold the equilibrium drug concentration provided by the crystalline form of apixaban alone.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
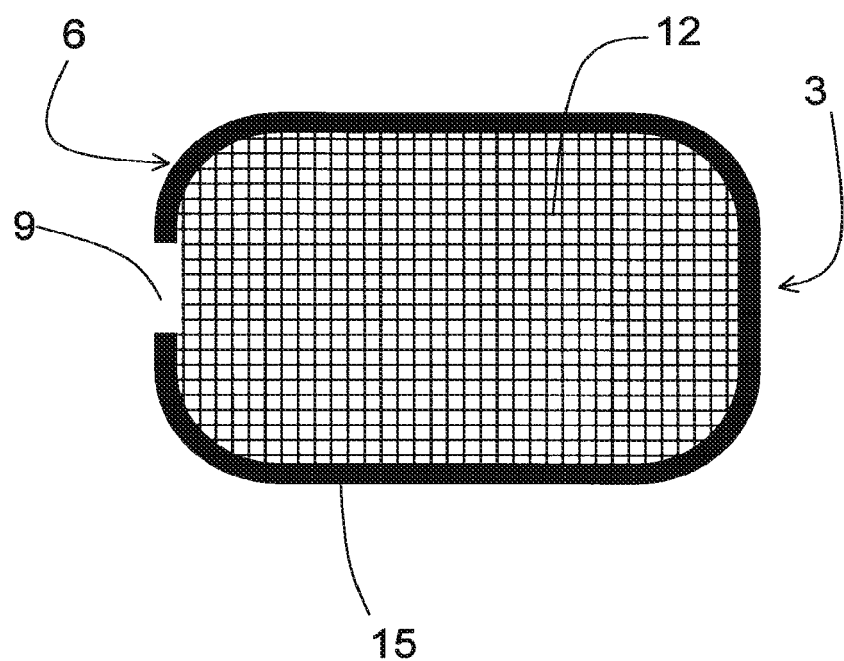
FIGS. 1-7 are schematic drawings of cross sections of exemplary embodiments of dosage forms of the present invention.

The present invention provides a controlled release dosage form comprising apixaban in a solubility-improved form. As used herein, by "immediate release" is meant that at least 70 wt % of a compound initially present in the dosage form is released within one hour or less following introduction to a use environment. By "controlled release" is meant that apixaban is released at a rate that is slower than immediate release i.e., less than 70 wt % of apixaban is released by (within) one hour following introduction to a use environment. Specific embodiments can be in the form of a sustained release oral dosage form, or, alternatively, in the form of a delayed release dosage form, or alternatively, in the form of an oral dosage form which exhibits a combination of sustained and delayed release characteristics. The term "controlled" is generic to "sustained" and "delayed." Thus, "controlled release" is intended to embrace sustained release and sustained release after a lag time of immediate release apixaban. Sustained release characteristics include dosage forms that release apixaban according to zero-order, first-order, mixed-order or other kinetics.

Reference to a "use environment" can either mean in vivo fluids, such as the GI tract, subdermal, intranasal, buccal, intrathecal, ocular, intraaural, subcutaneous spaces, vaginal tract, arterial and venous blood vessels, pulmonary tract or intramuscular tissue of an animal, such as a mammal and particularly a human, or the in vitro environment of a test solution, such as phosphate buffered saline (PBS), simulated intestinal buffer without enzymes (SIN), or a Model Fasted Duodenal (MFD) solution. An appropriate PBS solution is an aqueous solution comprising 20 mN sodium phosphate ($Na_2HPO_4$), 47 mM potassium phosphate ($KH_2PO_4$), 87 mM NaCl, and 0.2 mM KCl, adjusted to pH 6.5 with NaOH. An appropriate simulated intestinal fluid—no enzyme (SIN) solution is 50 mM $KH_2PO_4$ adjusted to pH 7.4 or 200 mM sodium phosphate ($Na_2HPO_4$) adjusted to pH 6.8. An appropriate MFD solution is the same PBS solution wherein additionally is present 7.3 mM sodium taurocholic acid and 1.4 mM of 1-palmitoyl-2-oleyl-sn-glycero-3-phosphocholine.

"Administration" to a use environment means, where the in vivo use environment is the GI tract, delivery by ingestion or swallowing or other such means to deliver the drugs. One skilled in the art will understand that "administration" to other in vivo use environments means contacting the use environment with the composition of the invention using methods known in the art. See for example, *Remington: The Science and Practice of Pharmacy*, 20th Edition (2000). Where the use environment is in vitro, "administration" refers to placement or delivery of the dosage form to the in vitro test medium.

Release rates, suitable dosage forms, apixaban and solubility-improved forms are discussed in more detail below.

Release Rates

The dosage forms of the present invention provide controlled-release of apixaban in a solubility-improved form. As previously stated, "controlled release" is meant that apixaban is released at a rate that is slower than immediate release i.e., less than 70 wt % of apixaban is released within one hour following introduction to a use environment. As used herein, the rate of release of apixaban from a dosage form is characterized by the percentage of apixaban initially present in the dosage form that is released within one hour subsequent to administering the dosage form to a use environment.

The release of apixaban from the dosage forms of the present invention may be characterized in terms of the time duration between introducing the dosage form to an environment of use and the time at which 70% of apixaban has left the dosage form. Description of apixaban release rate is complicated by the fact that such dosage forms may have initial delay periods during which little or no release occurs, and may release apixaban according to zero-order, first-order, mixed-order or other kinetics. To avoid confusion, release rates are described in terms of the time duration between dosing the dosage form to an environment of use and the time at which 70% of apixaban has left the dosage form. This description applies to all dosage forms that release apixaban, regardless of the shape of the percent released vs. time curve and is intended to embrace sustained release dosage forms as well as dosage forms that exhibit sustained release after an initial lag time. Thus, by "controlled release" of apixaban is meant a dosage form that releases less than 70 wt % of apixaban initially present in the dosage form at 1 hour following introduction to a use environment. By "sustained release" is meant a dosage form wherein apixaban is released slowly over time after administration to the use environment. A dosage form that releases 70 wt % of apixaban initially present in the dosage form over any 1 hour period following introduction to the use environment is not considered to be a sustained release dosage form.

In one embodiment, the time to release 70% of apixaban initially present in the dosage form is at least about 2 hours, preferably at least about 3 hours, more preferably at least about 4 hours.

However, the release of apixaban from the dosage form should not be too slow. Thus, it is also preferred that the time to release 70% of apixaban initially present in the dosage form be about 24 hours or less, more preferably about 20 hours or less, and most preferably about 18 hours or less.

The release of apixaban from the dosage form may also be characterized by an average rate of release of apixaban per hour for a time period, defined as the wt % of apixaban present in the dosage form released during the time period divided by the duration (in hours) of the time period. For example, if the dosage form releases 70 wt % of apixaban initially present in the dosage form within 16 hours, the average rate of release of apixaban is 4.4 wt %/hr (70 wt %/16 hours). While the average rate of release may be calculated at any time period following introduction to the use environment, conventionally the time used is the time required to release 70 wt % of apixaban initially present in the dosage form.

Thus, the dosage forms of this invention have an average rate of release of apixaban of less than about 70 wt %/hr. Preferably, the dosage forms of the present invention release apixaban at an average rate that is about 35 wt %/hr or less, more preferably about 23 wt %/hr or less, and even more preferably about 17.5 wt %/hr or less. It is also preferred that the dosage forms of the present invention release apixaban at an average rate that is about 2.9 wt %/hr or more, preferably about 3.5 wt %/hr or more, more preferably about 3.9 wt %/hr or more.

The dosage form of the present invention provides controlled release of apixaban relative to an immediate release control dosage form consisting of an equivalent amount of apixaban in the same solubility-improved form dosed as an oral powder for constitution. In one embodiment, when the use environment is the GI tract of a mammal, the dosage form provides a time to reach maximum drug concentration ($T_{max}$) in the blood of the mammal following administration that is longer than the immediate release control dosage form. Preferably, the $T_{max}$ in the blood is at least about 1.25-fold longer than the immediate release control dosage form, preferably at least about 1.5-fold longer, and more preferably at least about 2-fold longer. In addition, the maximum concentration of drug ($C_{max}$) in the blood is less than or equal to 80%, and may be less than or equal to 65%, or even less than or equal to 50% of the $C_{max}$ provided by the immediate release control dosage form. Both $T_{max}$ and $C_{max}$ may be compared in either the fed or fasted state, and the dosage form meets the above criteria for at least one of, and preferably both, the fed and fasted state.

In another aspect, the dosage forms of the present invention provide controlled release of apixaban which, after oral dosing, elicit the following effects: a decrease of 20% or more in mean plasma $C_{max}$ relative to a dosage form that provides immediate release of the same amount of the solubility-improved form of apixaban after dosing for 8 weeks. In other words, the dosage form, following administration to an in vivo use environment, provides a maximum drug concentration in the blood that is less than or equal to 80% of the maximum drug concentration in the blood provided by a dosage form that provides immediate release of the same amount of the solubility-improved form of said apixaban.

The dosage forms of the present invention may be dosed to a human subject in the fasted or fed state. It is preferred that they be dosed in the fed state.

Preferred apixaban doses and apixaban release rates from the dosage forms of this invention may be determined by pharmacokinetic (PK) modeling for apixaban, or by clinical experimentation (i.e. in human subjects or patients) as familiar to those experienced in the art. PK modeling may also be used to predict $C_{max}$ for various apixaban doses and release rates, in order to identify those doses and release rates that will decrease $C_{max}$ by 20% or more, relative to an immediate release dosage form at the same dose.

In one aspect, when apixaban in the dosage forms of the present invention, after oral dosing, elicit one or more of the following effects: (a) plasma concentrations of apixaban which exceed about 70 ng/ml, preferably about 110 ng/ml, more preferably about 160 ng/ml, even more preferably about 325 ng/ml for a period of around 12 hr or greater, preferably 16 hr or greater, more preferably about 24 hours or greater and (b) a decrease of 20% or more in mean plasma $C_{max}$ relative to a dosage form that provides immediate release of the same amount of the solubility-improved form of apixaban.

Expressed as release rate profiles, exemplary release rates are wherein the in-vitro dissolution rate of a dosage form is measured by the direct dissolution tests provided below.

In one embodiment, an exemplary dosage form has the release rate profile wherein less than about 10 wt % apixaban is released by one hour, about 60 wt % apixaban to about 80 wt % apixaban is released at about eight hours, and more than about 70 wt % apixaban is released at ten hours.

Analogously, in another embodiment, an exemplary dosage form has the release rate profile wherein less than about 10 wt % apixaban is released by one hour, about 20 wt % apixaban to about 40 wt % apixaban is released by four hours, about 60 wt % apixaban to about 80 wt % apixaban is released at about eight hours, and more than about 70 wt % apixaban is released at ten hours.

Analogously, in another embodiment, an exemplary dosage form has the release rate profile wherein less than about 20 wt % apixaban is released by one hour, about 50 wt % apixaban to about 75 wt % apixaban is released by four hours, and more than about 70 wt % apixaban is released at six hours.

Analogously, in another embodiment, an exemplary dosage form has the release rate profile wherein less than about 20 wt % apixaban is released by one hour, about 20 wt % apixaban to about 40 wt % apixaban is released by two hours, about 50 wt % apixaban to about 75 wt % apixaban is released at about four hours, and more than about 70 wt % apixaban is released at six hours.

In terms of average release rate, in one embodiment, an exemplary dosage form provides an average rate of release of apixaban that is at least about 8 wt %/hr. In another embodiment, an exemplary dosage form provides an average rate of release of apixaban that is from about 7 wt %/hr to about 10 wt %/hr. In yet another embodiment, an exemplary dosage form provides an average rate of release of apixaban that is from about 6 wt %/hr to about 13 wt %/hr.

In still another embodiment, an exemplary dosage form provides an average rate of release of apixaban that is at least about 13 wt %/hr. In another embodiment, an exemplary dosage form provides an average rate of release of apixaban that is from about 11 wt %/hr to about 18 wt %/hr.

The dosage forms of the present invention are dosed preferably once daily ("QD"). The achievement of this aspect depends upon apixaban dose and apixaban release rate from the dosage form.

An in vitro test is used to determine whether a dosage form provides a release profile within the scope of the present invention. In vitro tests are well known in the art. The in vitro tests are designed to mimic the behavior of the dosage form in vivo. One skilled in the art will understand that in such tests the dissolution medium need not act as a sink for the drug in the dosage form. This is particularly true of osmotic dosage forms where the rate at which undissolved drug extrudes from the osmotic dosage form is not substantially affected by the solubility of the drug in the dissolution medium. However, for dosage forms that deliver the drug in the dissolved state, it is preferred that a dissolution medium be chosen in which the solubility of the drug in the medium times the volume of the media exceeds the total mass of drug dosed; that is, the media should act as a sink for the drug. By "sink" is meant that the composition and volume of the dissolution medium is sufficient such that a quantity of drug alone equivalent to that in the dosage form will dissolve into the dissolution medium. Preferably, the composition and volume of dissolution medium is sufficient that a quantity of drug equivalent to at least about 2-fold that in the dosage form will dissolve in the dissolution medium. In most cases apixaban is sufficiently insoluble in aqueous media that a surfactant, such as sodium lauryl sulfate or other excipients may be added to the dissolution medium to raise the solubility of the drug and ensure the dissolution medium acts as a sink for the drug(s).

Thus, the following test (in vitro dosage form dissolution test) is that test (by definition) which is used to determine whether a dosage form provides a release profile within the scope of the present invention. In this test, a so-called "direct" test, the dosage form is placed into a dissolution medium at 37° C. simulating the contents of the intestine, and specifically 50 mM $KH_2PO_4$ at pH 7.4 or 200 mM $NaH_2PO_4$ at pH 6.8 with 0.5% sodium laurel sulfate (SLS). The medium is stirred using paddles that rotate at a rate of 75 rpm. When the dosage form is in the form of a tablet, capsule or other solid dosage form, the dosage form may be placed in a wire support to keep the dosage form off of the bottom of the flask, so that all of its surfaces are exposed to the dissolution media. Samples of the dissolution medium are taken at periodic intervals using a VanKel VK8000 autosampling dissoette with automatic receptor solution replacement. The concentration of dissolved drug in the dissolution medium is then determined by High Performance Liquid Chromatography (HPLC), by comparing UV absorbance of samples to the absorbance of drug standards. The mass of dissolved drug in the dissolution medium is then calculated from the concentration of drug in the medium and the volume of the medium, which value is used to calculate the actual amount of drug released from the dosage form, taking into consideration the mass of drug originally present in the dosage form.

While the above test is that test which is used to determine a release rate profile of a dosage form of the present invention, the dosage forms of the present invention may also be evaluated using a "residual test," which is performed as follows. A plurality of dosage forms are each placed into separate stirred USP type 2 dissoette flasks containing 900 mL of a buffer solution at 37° C. simulating a gastric or intestinal environment. After a given time interval, a dosage form is removed from a flask, released material is removed from the surface of the dosage form, and the dosage form cut in half and placed in 100 mL of a recovery solution as follows. For the first two hours, the dosage form is stirred in 25 mL acetone or other solvent suitable to dissolve any coating on the dosage form. Next, 125 mL of methanol is added and stirring continued overnight at ambient temperature to dissolve the drug remaining in the dosage form. Approximately 2 mL of the recovery solution is removed and centrifuged, and 250 mL of supernatant added to an HPLC vial and diluted with 750 mL methanol. Residual drug is then analyzed by HPLC. The amount of drug remaining in the dosage form is subtracted from the total drug initially present in the dosage form to obtain the amount released at each time interval.

Alternatively, an in vivo test may be used to determine whether a dosage form provides a drug release profile within the scope of the present invention. However, due to the inherent difficulties and complexity of the in vivo procedure, it is preferred that in vitro procedures be used to evaluate dosage forms even though the ultimate use environment is often the human GI tract. The in vitro tests described above are expected to approximate in vivo behavior, and a dosage form that meets the in vitro release rates described herein are within the scope of the invention. Dosage forms are dosed to a group of test subjects, such as humans, and drug release and drug absorption is monitored either by (1) periodically withdrawing blood and measuring the serum or plasma concentration of drug or (2) measuring the amount of drug remaining in the dosage form following its exit from the anus (residual drug) or (3) both (1) and (2). In the second method, residual drug is measured by recovering the dosage form upon exit from the anus of the test subject and measuring the amount of drug remaining in the dosage form using the same procedure described above for the in vitro residual test. The difference between the amount of drug in the original dosage form and the amount of residual drug is a measure of the amount of drug released during the mouth-to-anus transit time. This test has limited utility since it provides only a single drug release time point but is useful in demonstrating the correlation between in vitro and in vivo release.

In one in vivo method of monitoring drug release and absorption, the serum or plasma drug concentration is plotted along the ordinate (y-axis) against the blood sample time along the abscissa (x-axis). The data may then be analyzed to determine drug release rates using any conventional analysis, such as the Wagner-Nelson or Loo-Riegelman analysis. See also Welling, "Pharmacokinetics: Processes and Mathematics" (ACS Monograph 185, Amer. Chem. Soc., Washington, D.C., 1986). Treatment of the data in this manner yields an apparent in vivo drug release profile.

Dosage Forms

The dosage forms of the present invention provide controlled-release of apixaban in solubility-improved form. Controlled-release of apixaban is desirable for several reasons. It is often desirable to have a method of lowering the maximum apixaban concentration in the plasma ($C_{max}$) after dosing while still providing good bioavailability, in order to decrease undesirable side effects, relative to an immediate release dosage form containing an equivalent amount of apixaban. Furthermore, it is preferable that dosing of apixaban be convenient, i.e. once-per-day (QD), because patients who take multiple drugs may have a difficult time keeping track of which drugs to take at which time of day. Furthermore, some drugs such as apixaban are advantageously taken with a meal, and it is preferable to minimize the number of times per day that the drug is taken, to simplify the requirement that the drug be taken with a meal.

The means for providing controlled release of apixaban in solubility-improved form can be any device or collection of devices known in the pharmaceutical arts that allow delivery of a drug in a controlled manner. The controlled-release means slowly releases the solubility-improved form of apixaban to the use environment. Apixaban in solubility-improved form may be delivered into the use environment as a suspension, that is, as a plurality of small particles, the small particles comprising the controlled-release means, which allow the drug to dissolve at a controlled rate in the use environment. Exemplary controlled-release means include matrix controlled-release devices, osmotic controlled-release devices, and multiparticulate controlled-release devices. The controlled-release devices themselves may or may not dissolve.

Controlled-Release Means

The means for providing controlled release of apixaban in solubility-improved form can be any device or collection of devices known in the pharmaceutical arts that allow delivery of a drug in a controlled manner. Exemplary devices include erodible and non-erodible matrix controlled-release devices, osmotic controlled-release devices, and multiparticulate controlled-release devices.

Osmotic Controlled Release Devices

Apixaban in solubility-improved form may be incorporated into an osmotic controlled release device. Such devices have at least two components: (a) the core which contains an osmotic agent and the solubility-improved form of apixaban; and (b) a water permeable, non-dissolving and non-eroding coating surrounding the core, the coating controlling the influx of water to the core from an aqueous environment of use so as to cause drug release by extrusion of some or all of the core to the environment of use. The osmotic agent contained in the core of this device may be an aqueous-swellable hydrophilic polymer or it may be an osmogen, also known as an osmagent. The coating is preferably polymeric, aqueous-permeable, and has at least one delivery port. Examples of such devices are disclosed more fully in U.S. Pat. No. 6,706,283 the disclosure of which is hereby incorporated by reference.

In addition to the solubility-improved form of apixaban, the core of the osmotic device optionally includes an "osmotic agent." By "osmotic agent" is meant any agent that creates a driving force for transport of water from the environment of use into the core of the device. Exemplary osmotic agents are water-swellable hydrophilic polymers, and osmogens (or osmagens). Thus, the core may include water-swellable hydrophilic polymers, both ionic and non-ionic, often referred to as "osmopolymers" and "hydrogels." The amount of water-swellable hydrophilic polymers present in the core may range from about 5 to about 80 wt %, preferably 10 to 50 wt %. Exemplary materials include hydrophilic vinyl and acrylic polymers, polysaccharides such as calcium alginate, polyethylene oxide (PEO), polyethylene glycol (PEG), polypropylene glycol (PPG), poly(2-hydroxyethyl methacrylate), poly(acrylic) acid, poly(methacrylic) acid, polyvinylpyrrolidone (PVP) and crosslinked PVP, polyvinyl alcohol (PVA), PVA/PVP copolymers and PVA/PVP copolymers with hydrophobic monomers such as methyl methacrylate, vinyl acetate, and the like, hydrophilic polyurethanes containing large PEO blocks, sodium croscarmellose, carrageenan, hydroxyethyl cellulose (HEC), hydroxypropyl cellulose (HPC), hydroxypropyl methyl cellulose (HPMC), carboxymethyl cellulose (CMC) and carboxyethyl cellulose (CEC), sodium alginate, polycarbophil, gelatin, xanthan gum, and sodium starch glycolate. Other materials include hydrogels comprising interpenetrating networks of polymers that may be formed by addition or by condensation polymerization, the components of which may comprise hydrophilic and hydrophobic monomers such as those just mentioned. Preferred polymers for use as the water-swellable hydrophilic polymers include PEO, PEG, PVP, sodium croscarmellose, HPMC, sodium starch glycolate, polyacrylic acid and crosslinked versions or mixtures thereof.

The core may also include an osmogen (or osmagent). The amount of osmogen present in the core may range from about 2 to about 70 wt %, preferably 10 to 50 wt %. Typical classes of suitable osmogens are water-soluble organic acids, salts and sugars that are capable of imbibing water to thereby effect an osmotic pressure gradient across the barrier of the surrounding coating. Typical useful osmogens include magnesium sulfate, magnesium chloride, calcium chloride, sodium chloride, lithium chloride, potassium sulfate, sodium carbonate, sodium sulfite, lithium sulfate, potassium chloride, sodium sulfate, mannitol, xylitol, urea, sorbitol, inositol, raffinose, sucrose, glucose, fructose, lactose, citric acid, succinic acid, tartaric acid, and mixtures thereof. Particularly preferred osmogens are glucose, lactose, sucrose, mannitol, xylitol and sodium chloride.

The core may include a wide variety of additives and excipients that enhance the performance of the dosage form or that promote stability, tableting or processing. Such additives and excipients include tableting aids, surfactants, water-soluble polymers, pH modifiers, fillers, binders, pigments, disintegrants, antioxidants, lubricants and flavorants. Exemplary of such components are microcrystalline cellulose; metallic salts of acids such as aluminum stearate, calcium stearate, magnesium stearate, sodium stearate, and zinc stearate; pH control agents such as buffers, organic acids and organic acid salts and organic and inorganic bases; fatty acids, hydrocarbons and fatty alcohols such as stearic acid, palmitic acid, liquid paraffin, stearyl alcohol, and palmitol; fatty acid esters such as glyceryl (mono- and di-) stearates, triglycerides, glyceryl (palmiticstearic) ester, sorbitan esters, such as sorbitan monostearate, saccharose monostearate, saccharose monopalmitate, and sodium stearyl fumarate; polyoxyethylene sorbitan esters; surfactants, such as alkyl sulfates such as sodium lauryl sulfate and magnesium lauryl sulfate; polymers such as polyethylene glycols, polyoxyethylene glycols, polyoxyethylene and polyoxypropylene ethers and their copolymers, and polytetrafluoroethylene; and inorganic materials such as talc and dicalcium phosphate; cyclodextrins; sugars such as lactose and xylitol; and sodium starch glycolate. Examples of disintegrants are sodium starch glycolate (e.g., Explotab™), microcrystalline cellulose (e.g., Avicel™) microcrystalline silicified cellulose (e.g., ProSolv™), croscarmellose sodium (e.g., Ac-Di-Sol™).

When the solubility-improved form is a solid amorphous dispersion formed by a solvent process, such additives may be added directly to the spray-drying solution when forming an apixaban/concentration-enhancing polymer dispersion such that the additive is dissolved or suspended in the solution as a slurry. Alternatively, such additives may be added following the spray-drying process to aid in forming the final controlled release device. Such solubility-enhancing and other additives may also be blended with other solubility-improved forms of apixaban.

One embodiment of an osmotic device consists of one or more drug layers containing the solubility-improved form of apixaban, such as a solid amorphous drug/polymer dispersion, and a sweller layer that comprises a water-swellable polymer, with a coating surrounding the drug layer and sweller layer. Each layer may contain other excipients such as tableting aids, osmagents, surfactants, water-soluble polymers and water-swellable polymers.

Such osmotic delivery devices may be fabricated in various geometries including bilayer, wherein the core comprises a drug layer and a sweller layer adjacent to each other; trilayer, wherein the core comprises a sweller layer "sandwiched" between two drug layers; and concentric, wherein the core comprises a central sweller composition surrounded by the drug layer.

The coating of such a tablet comprises a membrane insoluble in water, but permeable to water and substantially impermeable to drug and excipients contained within. The coating contains one or more exit passageways or ports in communication with the drug-containing layer(s) for delivering the drug composition. The drug-containing layer(s) of the core contains the drug composition (including optional osmagents and hydrophilic water-soluble polymers), while the sweller layer consists of an expandable hydrogel, with or without additional osmotic agents.

When placed in an aqueous medium, the tablet imbibes water through the membrane, causing the composition to form a dispensable aqueous composition, and causing the hydrogel layer to expand and push against the drug-containing composition, forcing the composition out of the exit passageway. The composition can swell, aiding in forcing the drug out of the passageway. Drug can be delivered from this type of delivery system either dissolved or dispersed in the composition that is expelled from the exit passageway.

The rate of drug delivery is controlled by such factors as the permeability and thickness of the coating, the osmotic pressure of the drug-containing layer, the degree of hydrophilicity of the hydrogel layer, and the surface area of the device. Those skilled in the art will appreciate that increasing the thickness of the coating will reduce the release rate, while any of the following will increase the release rate: increasing the permeability of the coating; increasing the hydrophilicity of the hydrogel layer; increasing the osmotic pressure of the drug-containing layer; or increasing the device's surface area.

Exemplary materials useful in forming the drug-containing composition, in addition to the solubility-improved form of apixaban itself, include HPMC, PEO and PVP and other pharmaceutically acceptable carriers. In addition, osmagents such as sugars or salts, especially sucrose, lactose, xylitol, mannitol, or sodium chloride, may be added. Materials which are useful for forming the hydrogel layer include sodium CMC, PEO, poly (acrylic acid), sodium (polyacrylate), sodium croscarmellose, sodium starch glycolate, PVP, crosslinked PVP, and other high molecular weight hydrophilic materials. Particularly useful are PEO polymers having an average molecular weight from about 5,000,000 to about 7,500,000 daltons.

In the case of a bilayer geometry, the delivery port(s) or exit passageway(s) may be located on the side of the tablet containing the drug composition or may be on both sides of the tablet or even on the edge of the tablet so as to connect both the drug layer and the sweller layer with the exterior of the device. The exit passageway(s) may be produced by mechanical means or by laser drilling, or by creating a difficult-to-coat region on the tablet by use of special tooling during tablet compression or by other means.

The osmotic device can also be made with a homogeneous core surrounded by a semipermeable membrane coating, as in U.S. Pat. No. 3,845,770. The solubility-improved form of apixaban can be incorporated into a tablet core and a semipermeable membrane coating can be applied via conventional tablet-coating techniques such as using a pan coater. A drug delivery passageway can then be formed in this coating by drilling a hole in the coating, either by use of a laser or mechanical means. Alternatively, the passageway may be formed by rupturing a portion of the coating or by creating a region on the tablet that is difficult to coat, as described above.

A particularly useful embodiment of an osmotic device comprises: (a) a single-layer compressed core comprising: (i) the solubility-improved form of apixaban, (ii) a hydroxyethylcellulose, and (iii) an osmagent, wherein the hydroxyethylcellulose is present in the core from about 2.0% to about 35% by weight and the osmagent is present from about 15% to about 70% by weight; (b) a water-permeable layer surrounding the core; and (c) at least one passageway within the layer (b) for delivering the drug to a fluid environment surrounding the tablet. In a preferred embodiment, the device is shaped such that the surface area to volume ratio (of a water-swollen tablet) is greater than 0.6 mm$^{-1}$; more preferably greater than 1.0 mm$^{-1}$. It is preferred that the passageway connecting the core with the fluid environment be situated along the tablet band area. A particularly preferred shape is an oblong shape where the ratio of the tablet tooling axes, i.e., the major and minor axes which define the shape of the tablet, are between 1.3 and 3; more preferably between 1.5 and 2.5. In one embodiment, the combination of the solubility-improved form of the drug and the osmagent have an average ductility from about 100 to about 200 Mpa, an average tensile strength from about 0.8 to about 2.0 Mpa, and an average brittle fracture index less than about 0.2. The single-layer core may optionally include a disintegrant, a bioavailability enhancing additive, and/or a pharmaceutically acceptable excipient, carrier or diluent. Such devices are disclosed more fully in commonly owned, pending U.S. Patent Application publication 2003-0175346 the disclosure of which is incorporated herein by reference.

Entrainment of particles of the solubility-improved form of apixaban in the extruding fluid during operation of such osmotic device is highly desirable. For the particles to be well entrained, the drug form is preferably well dispersed in the fluid before the particles have an opportunity to settle in the tablet core. One means of accomplishing this is by adding a disintegrant that serves to break up the compressed core into its particulate components. Examples of standard disintegrants included materials such as sodium starch glycolate (e.g., Explotab™ CLV), microcrystalline cellulose (e.g., Avicel™), microcrystalline silicified cellulose (e.g., ProSolv™) and croscarmellose sodium (e.g., Ac-Di-Sol™), and other disintegrants known to those skilled in the art. Depending upon the particular formulation, some disintegrants work better than others. Several disintegrants tend to form gels as they swell with water, thus hindering drug delivery from the device. Non-gelling, non-swelling disintegrants provide a more rapid dispersion of the drug particles within the core as water enters the core. Preferred non-gelling, non-swelling disintegrants are resins, preferably ion-exchange resins. A preferred resin is Amberlite™ IRP 88 (available from Rohm and Haas, Philadelphia, Pa.). When used, the disintegrant is present in amounts ranging from about 1-25% of the core composition.

Water-soluble polymers are added to keep particles of the solubility-improved drug form suspended inside the device before they can be delivered through the passageway(s) (e.g., an orifice). High viscosity polymers are useful in preventing settling. However, the polymer in combination with the drug is extruded through the passageway(s) under relatively low pressures. At a given extrusion pressure, the extrusion rate typically slows with increased viscosity. Certain polymers in combination with particles of the solubility-improved drug form high viscosity solutions with water but are still capable of being extruded from the tablets with a relatively low force. In contrast, polymers having a low weight-average, molecular weight (<about 300,000) do not form sufficiently viscous solutions inside the tablet core to allow complete delivery due to particle settling. Settling of the particles is a problem when such devices are prepared with no polymer added, which leads to poor drug delivery unless the tablet is constantly agitated to keep the particles from settling inside the core. Settling is also problematic when the particles are large and/or of high density such that the rate of settling increases.

Preferred water-soluble polymers for such osmotic devices do not interact with the drug. Non-ionic polymers are preferred. An example of a non-ionic polymer forming solutions having a high viscosity yet still extrudable at low pressures is Natrosol™ 250H (high molecular weight hydroxyethylcellulose, available from Hercules Incorporated, Aqualon Division, Wilmington, Del.; MW equal to about 1 million daltons and a degree of polymerization equal to about 3,700). Natrosol™ 250H provides effective drug delivery at concentrations as low as about 3% by weight of the core when combined with an osmagent. Natrosol™ 250H NF is a high-viscosity grade nonionic cellulose ether that is soluble in hot or cold water. The viscosity of a 1% solution of Natrosol™ 250H using a Brookfield LVT (30 rpm) at 25° C. is between about 1,500 and about 2,500 cps.

Preferred hydroxyethylcellulose polymers for use in these monolayer osmotic tablets have a weight-average, molecular weight from about 300,000 to about 1.5 million. The hydroxyethylcellulose polymer is typically present in the core in an amount from about 2.0% to about 35% by weight.

Another example of an osmotic device is an osmotic capsule. The capsule shell or portion of the capsule shell can be semipermeable. The capsule can be filled either by a powder or liquid consisting of apixaban in solubility-improved form, excipients that imbibe water to provide osmotic potential, and/or a water-swellable polymer, or optionally solubilizing excipients. The capsule core can also be made such that it has a bilayer or multilayer composition analogous to the bilayer, trilayer or concentric geometries described above.

Another class of osmotic devices useful in this invention comprises coated swellable tablets, as described in EP 378 404, incorporated herein by reference. Coated swellable tablets comprise a tablet core comprising the solubility-improved form of the drug and a swelling material, preferably a hydrophilic polymer, coated with a membrane, which contains holes, or pores through which, in the aqueous use environment, the hydrophilic polymer can extrude and carry out the drug composition. Alternatively, the membrane may contain polymeric or low molecular weight water-soluble "porosigens". Porosigens dissolve in the aqueous use environment, providing pores through which the hydrophilic polymer and drug may extrude. Examples of porosigens are water-soluble polymers such as HPMC, PEG, and low molecular weight compounds such as glycerol, sucrose, glucose, and sodium chloride. In addition, pores may be formed in the coating by drilling holes in the coating using a laser or other mechanical means. In this class of osmotic devices, the membrane material may comprise any film-forming polymer, including polymers which are water permeable or impermeable, providing that the membrane deposited on the tablet core is porous or contains water-soluble porosigens or possesses a macroscopic hole for water ingress and drug release. Embodiments of this class of sustained release devices may also be multilayered, as described in EP 378 404.

When apixaban in solubility-improved form is a liquid or oil, such as a lipid vehicle formulation described herein, the osmotic controlled-release device may comprise a softgel or gelatin capsule formed with a composite wall and comprising the liquid formulation where the wall comprises a barrier layer formed over the external surface of the capsule, an expandable layer formed over the barrier layer, and a semipermeable layer formed over the expandable layer. A delivery port connects the liquid formulation with the aqueous use environment. Such devices are described more fully in U.S. Pat. Nos. 6,419,952, 6,342,249, 5,324,280, 4,672,850, 4,627,850, 4,203,440, and 3,995,631, all of which are incorporated herein by reference.

The osmotic controlled release devices of the present invention also comprise a coating. The essential constraints on the coating for an osmotic device are that it be water-permeable, have at least one port for the delivery of drug, and be non-dissolving and non-eroding during release of the drug formulation, such that drug is substantially entirely delivered through the delivery port(s) or pores as opposed to delivery primarily via permeation through the coating material itself. By "delivery port" is meant any passageway, opening or pore whether made mechanically, by laser drilling, by pore formation either during the coating process or in situ during use or by rupture during use. The coating should be present in an amount ranging from about 5 to 30 wt %, preferably 10 to 20 wt % relative to the core weight.

A preferred form of coating is a semipermeable polymeric membrane that has the port(s) formed therein either prior to or during use. Thickness of such a polymeric membrane may vary between about 20 and 800 μm, and is preferably in the range of 100 to 500 μm. The delivery port(s) should generally range in size from 0.1 to 3000 μm or greater, preferably on the order of 50 to 3000 μm in diameter. Such port(s) may be formed post-coating by mechanical or laser drilling or may be formed in situ by rupture of the coatings; such rupture may be controlled by intentionally incorporating a relatively small weak portion into the coating. Delivery ports may also be formed in situ by erosion of a plug of water-soluble material or by rupture of a thinner portion of the coating over an indentation in the core. In addition, delivery ports may be formed during coating, as in the case of asymmetric membrane coatings of the type disclosed in U.S. Pat. Nos. 5,612,059 and 5,698,220, the disclosures of which are incorporated by reference.

When the delivery port is formed in situ by rupture of the coating, a particularly preferred embodiment is a collection of beads that may be of essentially identical or of a variable composition. Drug is primarily released from such beads following rupture of the coating and, following rupture, such release may be gradual or relatively sudden. When the collection of beads has a variable composition, the composition may be chosen such that the beads rupture at various times following administration, resulting in the overall release of drug being sustained for a desired duration.

Coatings may be dense, microporous or "asymmetric," having a dense region supported by a thick porous region such as those disclosed in U.S. Pat. Nos. 5,612,059 and 5,698,220. When the coating is dense the coating is composed of a water-permeable material. When the coating is porous, it may be composed of either a water-permeable or a water-impermeable material. When the coating is composed of a porous water-impermeable material, water permeates through the pores of the coating as either a liquid or a vapor.

Examples of osmotic devices that utilize dense coatings include U.S. Pat. Nos. 3,995,631 and 3,845,770, the disclosures of which pertaining to dense coatings are incorporated herein by reference. Such dense coatings are permeable to the external fluid such as water and may be composed of any of the materials mentioned in these patents as well as other water-permeable polymers known in the art.

The membranes may also be porous as disclosed in U.S. Pat. Nos. 5,654,005 and 5,458,887 or even be formed from water-resistant polymers. U.S. Pat. No. 5,120,548 describes another suitable process for forming coatings from a mixture of a water-insoluble polymer and a leachable water-soluble additive, the pertinent disclosures of which are incorporated herein by reference. The porous membranes may also be formed by the addition of pore-formers as disclosed in U.S. Pat. No. 4,612,008, the pertinent disclosures of which are incorporated herein by reference.

In addition, vapor-permeable coatings may even be formed from extremely hydrophobic materials such as polyethylene or polyvinylidene difluoride that, when dense, are essentially water-impermeable, as long as such coatings are porous.

Materials useful in forming the coating include various grades of acrylics, vinyls, ethers, polyamides, polyesters and cellulosic derivatives that are water-permeable and water-insoluble at physiologically relevant pHs, or are susceptible to being rendered water-insoluble by chemical alteration such as by crosslinking.

Specific examples of suitable polymers (or crosslinked versions) useful in forming the coating include plasticized, unplasticized and reinforced cellulose acetate (CA), cellulose diacetate, cellulose triacetate, CA propionate, cellulose nitrate, cellulose acetate butyrate (CAB), CA ethyl carbamate, CAP, CA methyl carbamate, CA succinate, cellulose acetate trimellitate (CAT), CA dimethylaminoacetate, CA ethyl carbonate, CA chloroacetate, CA ethyl oxalate, CA methyl sulfonate, CA butyl sulfonate, CA p-toluene sulfonate, agar acetate, amylose triacetate, beta glucan acetate, beta glucan triacetate, acetaldehyde dimethyl acetate, triacetate of locust bean gum, hydroxlated ethylene-vinylacetate, EC, PEG, PPG, PEG/PPG copolymers, PVP, HEC, HPC, CMC, CMEC, HPMC, HPMCP, HPMCAS, HPMCAT, poly(acrylic) acids and esters and poly-(methacrylic) acids and esters and copolymers thereof, starch, dextran, dextrin, chitosan, collagen, gelatin, polyalkenes, polyethers, polysulfones, polyethersulfones, polystyrenes, polyvinyl halides, polyvinyl esters and ethers, natural waxes and synthetic waxes.

A preferred coating composition comprises a cellulosic polymer, in particular cellulose ethers, cellulose esters and cellulose ester-ethers, i.e., cellulosic derivatives having a mixture of ester and ether substituents.

Another preferred class of coating materials are poly (acrylic) acids and esters, poly(methacrylic) acids and esters, and copolymers thereof.

A more preferred coating composition comprises cellulose acetate. An even more preferred coating comprises a cellulosic polymer and PEG. A most preferred coating comprises cellulose acetate and PEG.

Coating is conducted in conventional fashion, typically by dissolving or suspending the coating material in a solvent and then coating by dipping, spray coating or preferably by pan-coating. A preferred coating solution contains 5 to 15 wt % polymer. Typical solvents useful with the cellulosic polymers mentioned above include acetone, methyl acetate, ethyl acetate, isopropyl acetate, n-butyl acetate, methyl isobutyl ketone, methyl propyl ketone, ethylene glycol monoethyl ether, ethylene glycol monoethyl acetate, methylene dichloride, ethylene dichloride, propylene dichloride, nitroethane, nitropropane, tetrachloroethane, 1,4-dioxane, tetrahydrofuran, diglyme, water, and mixtures thereof. Pore-formers and non-solvents (such as water, glycerol and ethanol) or plasticizers (such as diethyl phthalate) may also be added in any amount as long as the polymer remains soluble at the spray temperature. Pore-formers and their use in fabricating coatings are described in U.S. Pat. No. 5,612,059, the pertinent disclosures of which are incorporated herein by reference.

Coatings may also be hydrophobic microporous layers wherein the pores are substantially filled with a gas and are not wetted by the aqueous medium but are permeable to water vapor, as disclosed in U.S. Pat. No. 5,798,119, the pertinent disclosures of which are incorporated herein by reference. Such hydrophobic but water-vapor permeable coatings are typically composed of hydrophobic polymers such as polyalkenes, polyacrylic acid derivatives, polyethers, polysulfones, polyethersulfones, polystyrenes, polyvinyl halides, polyvinyl esters and ethers, natural waxes and synthetic waxes. Especially preferred hydrophobic microporous coating materials include polystyrene, polysulfones, polyethersulfones, polyethylene, polypropylene, polyvinyl chloride, polyvinylidene fluoride and polytetrafluoroethylene. Such hydrophobic coatings can be made by known phase inversion methods using any of vapor-quench, liquid quench, thermal processes, leaching soluble material from the coating or by sintering coating particles. In thermal processes, a solution of polymer in a latent solvent is brought to liquid-liquid phase separation in a cooling step. When evaporation of the solvent is not prevented, the resulting membrane will typically be porous. Such coating processes may be conducted by the processes disclosed in U.S. Pat. Nos. 4,247,498; 4,490,431 and 4,744,906, the disclosures of which are also incorporated herein by reference.

Osmotic controlled-release devices may be prepared using procedures known in the pharmaceutical arts. See for example, Remington: The Science and Practice of Pharmacy, 20$^{th}$ Edition, 2000.

Matrix Controlled Release Devices

In one embodiment, apixaban in solubility-improved form is incorporated into an erodible or non-erodible polymeric matrix controlled release device. By an erodible matrix is meant aqueous-erodible or water-swellable or aqueous-soluble in the sense of being either erodible or swellable or dissolvable in pure water or requiring the presence of an acid or base to ionize the polymeric matrix sufficiently to cause erosion or dissolution. When contacted with the aqueous environment of use, the erodible polymeric matrix imbibes water and forms an aqueous-swollen gel or "matrix" that entraps the solubility-improved form of apixaban. The aqueous-swollen matrix gradually erodes, swells, disintegrates or dissolves in the environment of use, thereby controlling the release of apixaban to the environment of use. Examples of such devices are disclosed more fully in commonly assigned pending EP Pat. No. 1027887 the relevant disclosure of which is herein incorporated by reference.

The erodible polymeric matrix into which apixaban in solubility-improved form is incorporated may generally be described as a set of excipients that are mixed with the solubility-improved form following its formation that, when contacted with the aqueous environment of use imbibes water and forms a water-swollen gel or "matrix" that entraps the drug form. Drug release may occur by a variety of mechanisms: the matrix may disintegrate or dissolve from around particles or granules of the drug in solubility-improved form; or the drug may dissolve in the imbibed aqueous solution and diffuse from the tablet, beads or granules of the device. A key ingredient of this water-swollen matrix is the water-swellable, erodible, or soluble polymer, which may generally be described as an osmopolymer, hydrogel or water-swellable polymer. Such polymers may be linear, branched, or crosslinked. They may be homopolymers or copolymers. Although they may be synthetic polymers derived from vinyl, acrylate, methacrylate, urethane, ester and oxide monomers, they are most preferably derivatives of naturally occurring polymers such as polysaccharides or proteins.

Such materials include naturally occurring polysaccharides such as chitin, chitosan, dextran and pullulan; gum agar, gum arabic, gum karaya, locust bean gum, gum tragacanth, carrageenans, gum ghatti, guar gum, xanthan gum and scleroglucan; starches such as dextrin and maltodextrin; hydrophilic colloids such as pectin; phosphatides such as lecithin; alginates such as ammonium alginate, sodium, potassium or calcium alginate, propylene glycol alginate; gelatin; collagen; and cellulosics. By "cellulosics" is meant a cellulose polymer that has been modified by reaction of at least a portion of the hydroxyl groups on the saccharide repeat units with a compound to form an ester-linked or an ether-linked substituent. For example, the cellulosic ethyl cellulose has an ether linked ethyl substituent attached to the saccharide repeat unit, while the cellulosic cellulose acetate has an ester linked acetate substituent.

A preferred class of cellulosics for the erodible matrix comprises aqueous-soluble and aqueous-erodible cellulosics such as ethyl cellulose (EC), methylethyl cellulose (MEC), carboxymethyl cellulose (CMC), CMEC, hydroxyethyl cellulose (HEC), hydroxypropyl cellulose (HPC), cellulose acetate (CA), cellulose propionate (CP), cellulose butyrate (CB), cellulose acetate butyrate (CAB), CAP, CAT, hydroxypropyl methyl cellulose (HPMC), HPMCP, HPMCAS, hydroxypropyl methyl cellulose acetate trimellitate (HPMCAT), and ethylhydroxy ethylcellulose (EHEC). A particularly preferred class of such cellulosics comprises various grades of low viscosity (MW less than or equal to 50,000 daltons) and high viscosity (MW greater than 50,000 daltons) HPMC. Commercially available low viscosity HPMC polymers include the Dow METHOCEL series E5, E15LV, E50LV and K100LV, while high viscosity HPMC polymers include E4MCR, E10MCR, K4M, K15M and K100M; especially preferred in this group are the METHOCEL (Trademark) K series. Other commercially available types of HPMC include the Shin Etsu METOLOSE 90SH series.

Although the primary role of the erodible matrix material is to control the rate of release of apixaban in solubility-improved form to the environment of use, the inventors have found that the choice of matrix material can have a large effect on the maximum drug concentration attained by the device as well as the maintenance of a high drug concentration. In one embodiment, the matrix material is a concentration-enhancing polymer, as defined herein below.

Other materials useful as the erodible matrix material include, but are not limited to, pullulan, polyvinyl pyrrolidone, polyvinyl alcohol, polyvinyl acetate, glycerol fatty acid esters, polyacrylamide, polyacrylic acid, copolymers of ethacrylic acid or methacrylic acid (EUDRAGIT®, Rohm America, Inc., Piscataway, N.J.) and other acrylic acid derivatives such as homopolymers and copolymers of butylmethacrylate, methylmethacrylate, ethylmethacrylate, ethylacrylate, (2-dimethylaminoethyl)methacrylate, and (trimethylaminoethyl) methacrylate chloride.

The erodible matrix polymer may contain a wide variety of the same types of additives and excipients known in the pharmaceutical arts, including osmopolymers, osmagens, solubility-enhancing or -retarding agents and excipients that promote stability or processing of the device.

Alternatively, the compositions of the present invention may be administered by or incorporated into a non-erodible matrix device. In such devices, apixaban in solubility-improved form is distributed in an inert matrix. The drug is released by diffusion through the inert matrix. Examples of materials suitable for the inert matrix include insoluble plastics, such as methyl acrylate-methyl methacrylate copolymers, polyvinyl chloride, and polyethylene; hydrophilic polymers, such as ethyl cellulose, cellulose acetate, and crosslinked polyvinylpyrrolidone (also known as crospovidone); and fatty compounds, such as carnauba wax, microcrystalline wax, and triglycerides. Such devices are described further in Remington: The Science and Practice of Pharmacy, 20$^{th}$ edition (2000).

Matrix controlled release devices may be prepared by blending apixaban in solubility-improved form and other excipients together, and then forming the blend into a tablet, caplet, pill, or other device formed by compressive forces. Such compressed devices may be formed using any of a wide variety of presses used in the fabrication of pharmaceutical devices. Examples include single-punch presses, rotary tablet presses, and multilayer rotary tablet presses, all well known in the art. See for example, Remington: The Science and Practice of Pharmacy, 20$^{th}$ Edition, 2000. The compressed device may be of any shape, including round, oval, oblong, cylindrical, or triangular. The upper and lower surfaces of the compressed device may be flat, round, concave, or convex.

When formed by compression, the device preferably has a "strength" of at least 5 Kiloponds (Kp)/cm$^2$, and more preferably at least 7 Kp/cm$^2$. Here, "strength" is the fracture force, also known as the tablet "hardness," required to fracture a tablet formed from the materials, divided by the maximum cross-sectional area of the tablet normal to that force. The fracture force may be measured using a Schleuniger Tablet Hardness Tester, Model 6D. The compression force required to achieve this strength will depend on the size of the tablet, but generally will be greater than about 5 kP/cm$^2$. Friability is a well-known measure of a device's resistance to surface abrasion that measures weight loss in percentage after subjecting the device to a standardized agitation procedure. Friability values of from 0.8 to 1.0% are regarded as constituting the upper limit of acceptability. Devices having a strength of greater than 5 kP/cm$^2$ generally are very robust, having a friability of less than 0.5%, Other methods for forming matrix controlled-release devices are well known in the pharmaceutical arts. See for example, Remington: The Science and Practice of Pharmacy, 20$^{th}$ Edition, 2000.

Multiparticulate Controlled Release Devices

The dosage forms of the present invention may also provide controlled release of apixaban in solubility-improved form through the use of multiparticulate controlled release devices. Multiparticulates generally refer to devices that comprise a multiplicity of particles or granules that may range in size from about 10 μm to about 2 mm, more typically about 100 μm to 1 mm in diameter. Such multiparticulates may be packaged, for example, in a capsule such as a gelatin capsule or a capsule formed from an aqueous-soluble polymer such as HPMCAS, HPMC or starch; dosed as a suspension or slurry in a liquid; or they may be formed into a tablet, caplet, or pill by compression or other processes known in the art.

Such multiparticulates may be made by any known process, such as wet- and dry-granulation processes, extrusion/spheronization, roller-compaction, melt-congealing, or by spray-coating seed cores. For example, in wet- and dry-granulation processes, the composition comprising the solubility-improved form of apixaban and optional excipients may be granulated to form multiparticulates of the desired size. Other excipients, such as a binder (e.g., microcrystalline cellulose), may be blended with the composition to aid in processing and forming the multiparticulates. In the case of wet granulation, a binder such as microcrystalline cellulose may be included in the granulation fluid to aid in forming a suitable multiparticulate. See, for example, Remington: The Science and Practice of Pharmacy, 20$^{th}$ Edition, 2000.

In any case, the resulting particles may themselves constitute the multiparticulate device or they may be coated by various film-forming materials such as enteric polymers or water-swellable or water-soluble polymers, or they may be combined with other excipients or vehicles to aid in dosing to patients.

Exemplary Embodiments (With Reference to the Figures)

The dosage forms of the present invention provide controlled release of apixaban in solubility improved form. In one aspect, the dosage form is in the form of a unitary dosage form. By "unitary dosage form" is meant a single dosage form containing apixaban is in solubility-improved form so that, following administration of the unitary dosage form to a use environment, apixaban is delivered to the use environment as controlled release. The term "unitary dosage form" includes a single tablet, caplet, pill, capsule, sachet, powder, solution, and a kit comprising one or more tablets, caplets, pills, capsules, sachets, powders, or solutions intended to be taken together.

In one embodiment, the unitary dosage form comprises an apixaban composition shown schematically as dosage form 3 in FIG. 1. The apixaban composition is in the form of an osmotic controlled release device 6. The osmotic controlled release device 6 comprises a core 12, a coating 15, and a delivery port 9. The core may be a single composition, or may consist of several layers, including layers comprising apixaban in solubility-improved form and highly swelling layers for extruding apixaban into the use environment.

Figure 2:
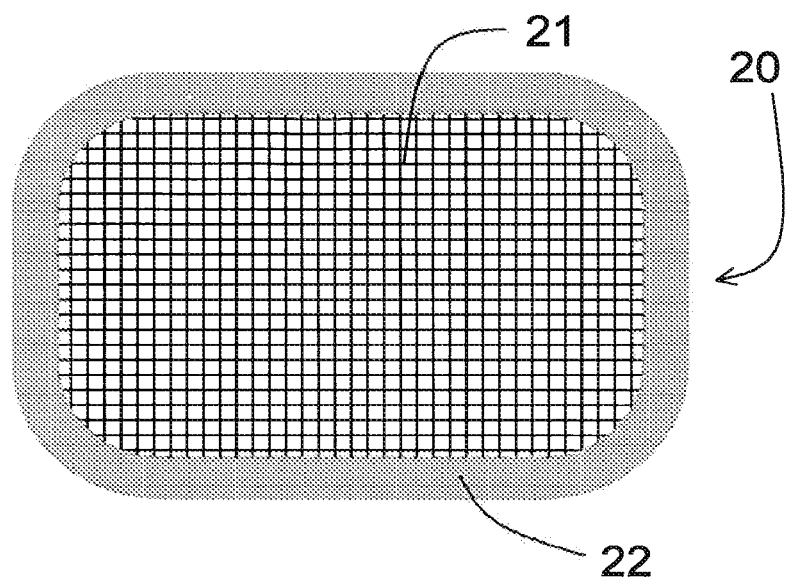

In one embodiment, the unitary dosage form comprises an apixaban composition, wherein the apixaban composition is in the form of a matrix controlled release device. The apixaban composition comprises apixaban in solubility-improved form, a matrix polymer, and optional excipients as previously discussed for matrix controlled-release devices. Referring to FIG. 2, in one aspect, the unitary dosage form 20 is in the form of a matrix tablet 21 comprising apixaban in solubility-improved form having a coating (as described herein) 22 including excipients, as discussed herein.

Figure 3:
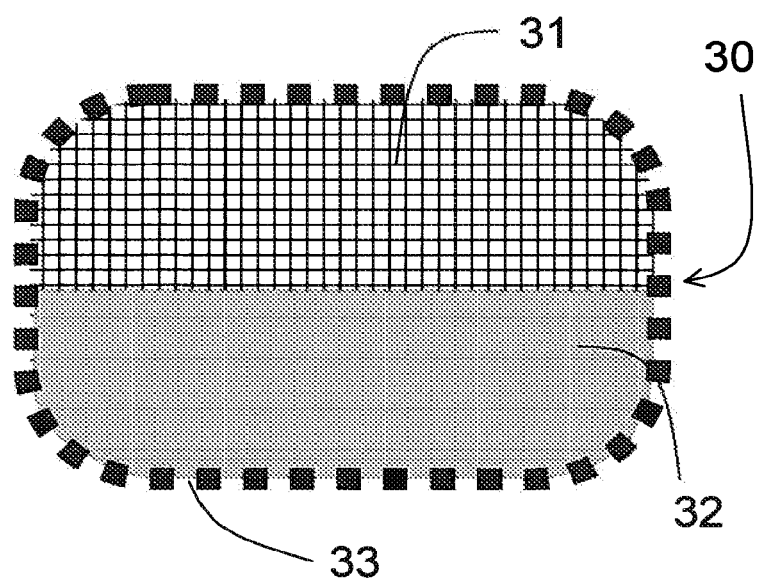

Alternatively, the unitary dosage form comprises apixaban shown schematically as dosage form 30 in FIG. 3. An apixaban composition 30 is in the form of a matrix controlled release device 31 and a sweller layer (or a second apixaban composition in the form of an immediate release layer) 32 (the sweller layer described herein) associated with the matrix device. By associated with is meant that the layer comprising the sweller layer 32 is adjacent to or substantially in contact with the matrix controlled release device 31. The sweller layer 32 may also be separated from the matrix controlled-release device by an intermediate layer (not shown in FIG. 3) comprising a binder or diluent, as known in the art. The unitary dosage form 30 may optionally be coated with a conventional coating 33.

Figure 4:
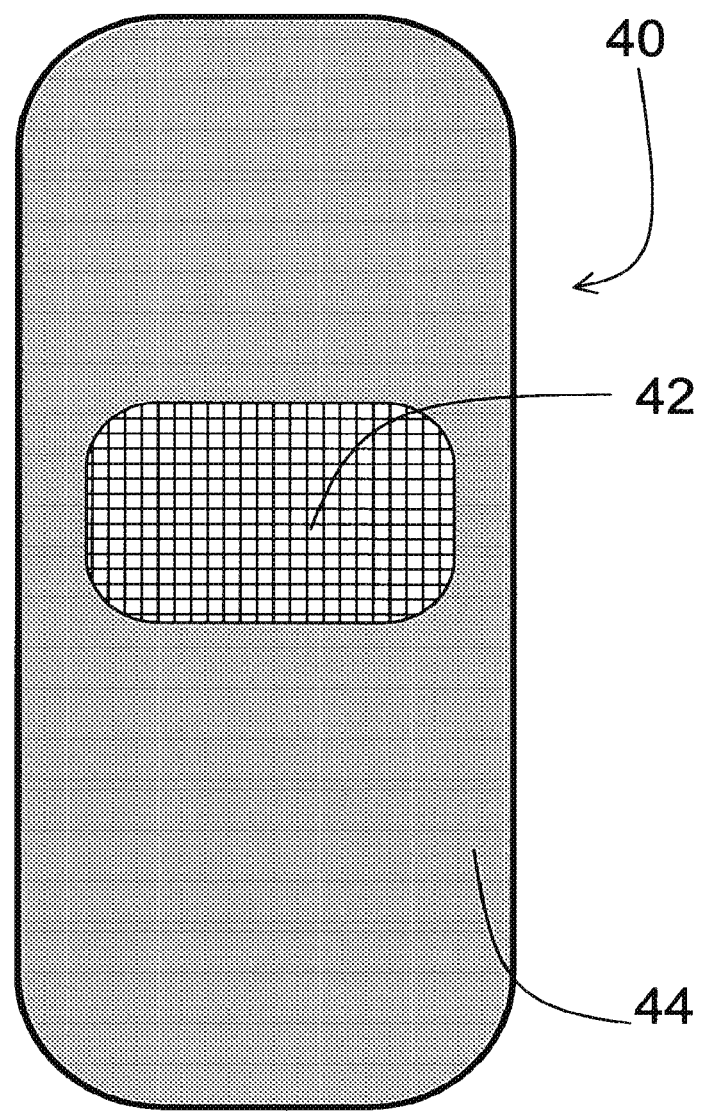

In another embodiment, the unitary dosage form is in the form of a capsule, the capsule, shown schematically as dosage form 40 in FIG. 4. The capsule comprises (1) at least one controlled-release device 42, such as a matrix controlled release device or an osmotic controlled release device, comprising apixaban in solubility-improved form. In this embodiment, the controlled-release device 42 comprising apixaban is first made using procedures known in the art, and then may be combined, such as by placing into a suitable capsule, such as a hard gelatin capsule or a soft gelatin capsule, well known in the art (see, for example, *Remington: The Science and Practice of Pharmacy*, (20th ed. 2000)). In one embodiment, apixaban is in the form of a matrix controlled-release device previously discussed. In another embodiment, apixaban is in the form of an osmotic controlled-release device, previously discussed. The optional layer 44 may be excipients e.g., described herein.

Figure 5:
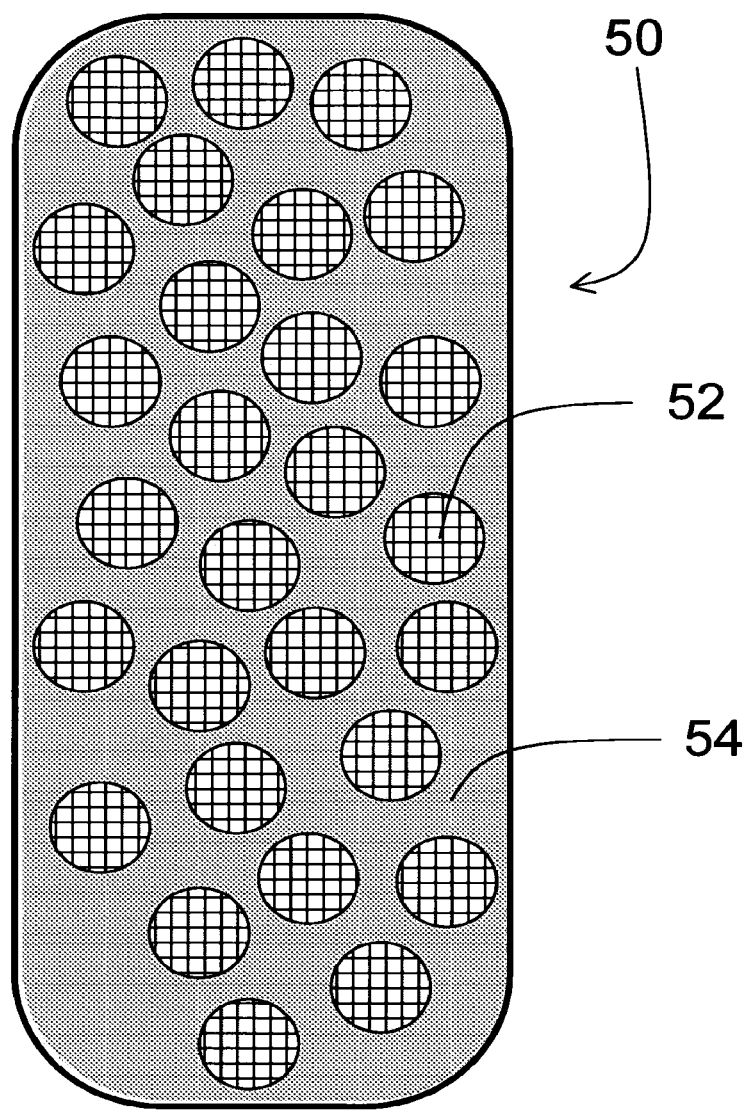

In another embodiment, the unitary dosage form is in the form of a capsule, shown schematically as dosage form 50 in FIG. 5. The capsule comprises (1) a plurality of controlled-release devices, such as controlled-release multiparticulates or granules 52 comprising apixaban in solubility-improved form, and (2) optional excipients 54. The controlled-release apixaban multiparticulates or granules 52 and excipients 54 are first made using the procedures previously outlined, and then may be combined, such as by placing them into a suitable capsule, such as a hard gelatin capsule or a soft gelatin capsule, well known in the art (see, for example, *Remington: The Science and Practice of Pharmacy*, (20th ed. 2000)).

Figure 6:
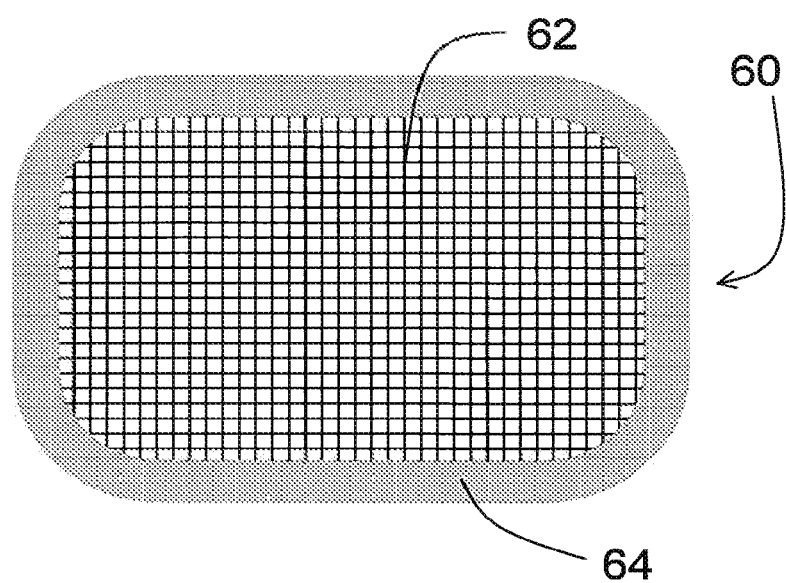

In yet another embodiment, the unitary dosage form comprises apixaban and a combination agent composition, wherein the apixaban composition is in the form of a matrix controlled release device and the combination agent composition is in the form of an immediate release coating. The apixaban composition comprises apixaban in solubility-improved form, a matrix polymer, and optional excipients as previously discussed for matrix controlled-release devices. The combination agent composition comprises the combination agent and optional excipients. Referring to FIG. 6, in one aspect, the unitary dosage form 60 is in the form of a matrix tablet 62 comprising apixaban in solubility-improved form that is coated with an immediate release coating 64 comprising the combination agent and optional excipients, as discussed above. The immediate release coating 64 may optionally be coated with a conventional coating (not shown in FIG. 6).

Figure 7:
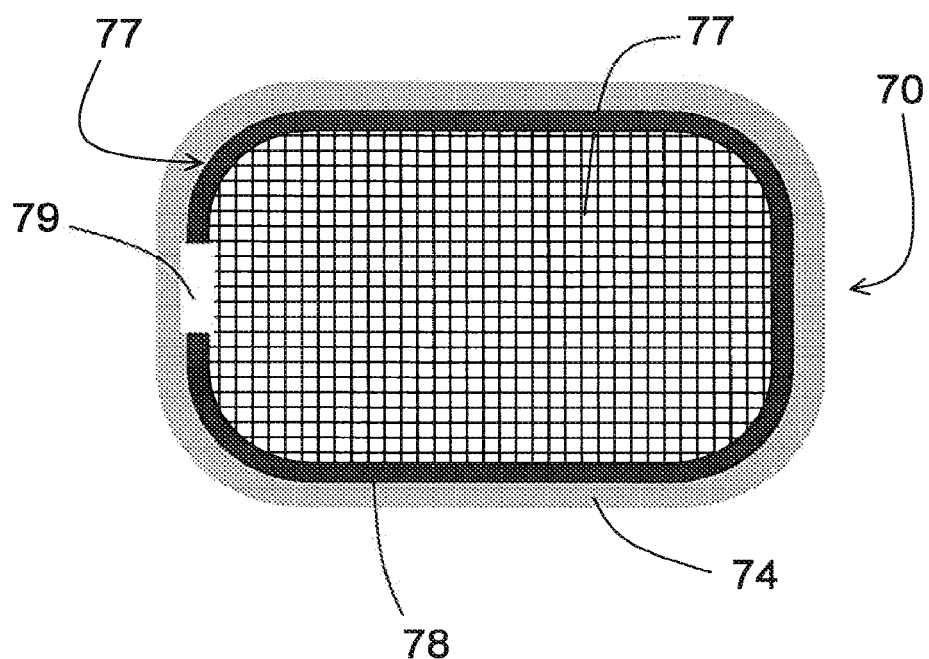

In another embodiment, the unitary dosage form comprises an apixaban composition and a combination agent composition, shown schematically as dosage form 70 in FIG. 7. The apixaban composition is in the form of an osmotic controlled release device 77 and the combination agent composition is in the form of an immediate release coating 74. The osmotic controlled release device 77 comprises a core 73, a coating 78, and a delivery port 79. The core may be a single composition, or may consist of several layers, including layers comprising the CETP inhibitor in solubility-improved form and highly swelling layers for extruding the CETP inhibitor into the use environment. The immediate release coating 74 may optionally be coated with a conventional coating (not shown in FIG. 7).

The invention also covers a method of treating a subject in need of apixaban therapy comprising administering to a subject in need of such therapy a dosage form of the present invention. The dosage form provides at least one of: (i) at least 50% inhibition of Factor Xa for at least 12 hours; (ii) a maximum drug concentration in the blood that is less than or equal to 80% of the maximum drug concentration in the blood provided by a dosage form that provides immediate release of the same amount of the solubility-improved form of said apixaban; and (iii) a mean Factor Xa inhibition level after dosing for 8 weeks that is less than or equal to about 90% that obtained prior to dosing.

The dosage forms of the present invention may optionally be coated with a conventional coating well known in the art. The coatings may be used to mask taste, improve appearance, facilitate swallowing of the dosage form, or to delay, sustain or otherwise control the release of the drug from the dosage form. Such coatings may be fabricated by any conventional means including fluidized bed coating, spray-coating, pan-coating and powder-coating using aqueous or organic solvents. Examples of suitable coating materials include sucrose, maltitol, cellulose acetate, ethyl cellulose, methylcellulose, sodium carboxymethyl cellulose, hydroxyethyl cellulose, hydroxypropyl cellulose, hydroxypropyl methylcellulose, polymethacrylates, polyacrylates, polyvinyl alcohol, polyvinyl pyrrolidone, cetyl alcohol, gelatin, maltodextrin, paraffin wax, microcrystalline wax, and Carnauba wax. Mixtures of polymers may also be used. Preferred coatings include the commercial aqueous coating formulations Surelease® and Opadry® available from Colorcon Inc. (West Point, Pa.).

Apixaban

Apixaban and methods for preparing such compounds are disclosed in U.S. Pat. Nos. 6,967,208 and 7,396,932 and in PCT Publication Nos. WO 2007/001385 and WO2006/13542 the disclosures of which are herein incorporated by reference.

Apixaban has a low solubility in aqueous environments such as the lumenal fluid of the human GI tract. Apixaban is a weak base and is its' solubility is less than about 1 µg/mL at room temperature at pH 6.8. Apixaban can be presented to the GI tract in a solubility-improved form to improve the drug concentration in the GI tract in order to improve absorption into the blood to elicit an improved therapeutic effect. Such enhancements in drug concentration in gastrointestinal fluid can be at least about 2-fold and often at least about 3-fold or even at least about 5-fold. Such formulations are generally termed "solubility-improved" forms.

Combination Agents

The compounds of the present invention can be administered alone or in combination with one or more additional therapeutic agents. By "administered in combination" or "combination therapy" it is meant that a compound of the present invention and one or more additional therapeutic agents are administered concurrently to the mammal being treated. When administered in combination each component may be administered at the same time or sequentially in any order at different points in time. Thus, each component may be administered separately but sufficiently closely in time so as to provide the desired therapeutic effect. Thus, the methods of prevention and treatment described herein include use of combination agents.

The combination agents are administered to a mammal in a therapeutically effective amount. By "therapeutically effective amount" it is meant an amount of a compound of the present invention that, when administered alone or in combination with an additional therapeutic agent to a mammal, is effective to treat the desired disease/condition e.g., a thromboembolic condition or disease.

Additional therapeutic agents include other anti-coagulant or coagulation inhibitory agents, anti-platelet or platelet inhibitory agents, thrombin inhibitors, thrombolytic or fibrinolytic agents, anti-arrhythmic agents, anti-hypertensive agents, calcium channel blockers (L-type and T-type), cardiac glycosides, diuretics, mineralocorticoid receptor antagonists, phosphodiesterase inhibitors, cholesterol/lipid lowering agents and lipid profile therapies, anti-diabetic agents, anti-depressants, anti-inflammatory agents (steroidal and non-steroidal), anti-osteoporosis agents, hormone replacement therapies, oral contraceptives, anti-obesity agents, anti-anxiety agents, anti-proliferative agents, anti-tumor agents, anti-ulcer and gastroesophageal reflux disease agents, growth hormone and/or growth hormone secretagogues, thyroid mimetics (including thyroid receptor antagonist), anti-infective agents, anti-viral agents, anti-bacterial agents, and anti-fungal agents.

In another embodiment, the present invention provides a combination wherein the second agent is at least one agent selected from a second factor Xa inhibitor, an anti-coagulant agent, an anti-platelet agent, a thrombin inhibiting agent, a thrombolytic agent, and a fibrinolytic agent.

In another preferred embodiment the second agent is at least one agent selected from warfarin, unfractionated heparin, low molecular weight heparin, synthetic pentasaccharide, hirudin, argatroban, aspirin, ibuprofen, naproxen, sulindac, indomethacin, mefenamate, droxicam, diclofenac, sulfinpyrazone, piroxicam, ticlopidine, clopidogrel, tirofiban, eptifibatide, abciximab, melagatran, disulfatohirudin, tissue plasminogen activator, modified tissue plasminogen activator, anistreplase, urokinase, and streptokinase.

A preferred second agent is at least one anti-platelet agent. Especially preferred anti-platelet agents are aspirin and clopidogrel.

The term anti-platelet agents (or platelet inhibitory agents), as used herein, denotes agents that inhibit platelet function, for example by inhibiting the aggregation, adhesion or granular secretion of platelets. Agents include, but are not limited to, the various known non-steroidal anti-inflammatory drugs (NSAIDS) such as aspirin, ibuprofen, naproxen, sulindac, indomethacin, mefenamate, droxicam, diclofenac, sulfinpyrazone, piroxicam, and pharmaceutically acceptable salts or prodrugs thereof. Of the NSAIDS, aspirin (acetylsalicyclic acid or ASA) and piroxicam are preferred. Other suitable platelet inhibitory agents include IIb/IIIa antagonists (e.g., tirofiban, eptifibatide, and abciximab), thromboxane-A2-receptor antagonists (e.g., ifetroban), thromboxane-A2-synthetase inhibitors, PDE-III inhibitors (e.g., dipyridamole), and pharmaceutically acceptable salts or prodrugs thereof.

The term anti-platelet agents (or platelet inhibitory agents), as used herein, is also intended to include ADP (adenosine diphosphate) receptor antagonists, preferably antagonists of the purinergic receptors $P_2Y_1$ and $P_2Y_{12}$, with $P_2Y_{12}$ being even more preferred. Preferred $P_2Y_{12}$ receptor antagonists include ticlopidine and clopidogrel, including pharmaceutically acceptable salts or prodrugs thereof. Clopidogrel is an even more preferred agent. Ticlopidine and clopidogrel are also preferred compounds since they are known to be gentle on the gastro-intestinal tract in use.

The term thrombin inhibitors (or anti-thrombin agents), as used herein, denotes inhibitors of the serine protease thrombin. By inhibiting thrombin, various thrombin-mediated processes, such as thrombin-mediated platelet activation (that is, for example, the aggregation of platelets, and/or the granular secretion of plasminogen activator inhibitor-1 and/or serotonin) and/or fibrin formation are disrupted. A number of thrombin inhibitors are known to one of skill in the art and these inhibitors are contemplated to be used in combination with the present compounds. Such inhibitors include, but are not limited to, boroarginine derivatives, boropeptides, heparins, hirudin, argatroban, and melagatran, including pharmaceutically acceptable salts and prodrugs thereof.

Boroarginine derivatives and boropeptides include N-acetyl and peptide derivatives of boronic acid, such as C-terminal alpha-aminoboronic acid derivatives of lysine, ornithine, arginine, homoarginine and corresponding isothiouronium analogs thereof. The term hirudin, as used herein, includes suitable derivatives or analogs of hirudin, referred to herein as hirulogs, such as disulfatohirudin. The term thrombolytics or fibrinolytic agents (or thrombolytics or fibrinolytics), as used herein, denote agents that lyse blood clots (thrombi). Such agents include tissue plasminogen activator (natural or recombinant) and modified forms thereof, anistreplase, urokinase, streptokinase, tenecteplase (TNK), lanoteplase (nPA), factor VIIa inhibitors, PAI-1 inhibitors (i.e., inactivators of tissue plasminogen activator inhibitors), alpha2-antiplasmin inhibitors, and anisoylated plasminogen streptokinase activator complex, including pharmaceutically acceptable salts or prodrugs thereof. The term anistreplase, as used herein, refers to anisoylated plasminogen streptokinase activator complex, as described, for example, in EP 028,489, the disclosure of which is hereby incorporated herein by reference herein. The term urokinase, as used herein, is intended to denote both dual and single chain urokinase, the latter also being referred to herein as prourokinase.

Examples of suitable anti-arrhythmic agents include: Class I agents (such as propafenone); Class II agents (such as carvadiol and propranolol); Class III agents (such as sotalol, dofetilide, amiodarone, azimilide and ibutilide); Class IV agents (such as ditiazem and verapamil); K$^+$ channel openers such as $I_{Ach}$ inhibitors, and $I_{Kur}$ inhibitors (e.g., compounds such as those disclosed in WO01/40231).

Examples of suitable anti-hypertensive agents include: alpha adrenergic blockers; beta adrenergic blockers; calcium channel blockers (e.g., diltiazem, verapamil, nifedipine, amlodipine and mybefradil); diuretics (e.g., chlorothiazide, hydrochlorothiazide, flumethiazide, hydroflumethiazide, bendroflumethiazide, methylchlorothiazide, trichloromethiazide, polythiazide, benzthiazide, ethacrynic acid tricrynafen, chlorthalidone, furosemide, musolimine, bumetanide, triamtrenene, amiloride, spironolactone); renin inhibitors; ACE inhibitors (e.g., captopril, zofenopril, fosinopril, enalapril, ceranopril, cilazopril, delapril, pentopril, quinapril, ramipril, lisinopril); AT-1 receptor antagonists (e.g., losartan, irbesartan, valsartan); ET receptor antagonists (e.g., sitaxsentan, atrsentan and compounds disclosed in U.S. Pat. Nos. 5,612,359 and 6,043,265); Dual ET/AII antagonist (e.g., compounds disclosed in WO 00/01389); neutral endopeptidase (NEP) inhibitors; vasopeptidase inhibitors (dual NEP-ACE inhibitors) (e.g., omapatrilat, gemopatrilat and nitrates).

Examples of suitable calcium channel blockers (L-type or T-type) include diltiazem, verapamil, nifedipine, amlodipine and mybefradil.

Examples of suitable cardiac glycosides include digitalis and ouabain.

Examples of suitable diuretics include: chlorothiazide, hydrochlorothiazide, flumethiazide, hydroflumethiazide, bendroflumethiazide, methylchlorothiazide, trichloromethiazide, polythiazide, benzthiazide, ethacrynic acid tricrynafen, chlorthalidone, furosemide, musolimine, bumetanide, triamtrenene, amiloride, and spironolactone.

Examples of suitable mineralocorticoid receptor antagonists include sprionolactone and eplirinone.

Examples of suitable phosphodiesterase inhibitors include: PDE III inhibitors (such as cilostazol); and PDE V inhibitors (such as sildenafil).

Examples of suitable cholesterol/lipid lowering agents and lipid profile therapies include: HMG-CoA reductase inhibitors (e.g., pravastatin, lovastatin, atorvastatin, simvastatin, fluvastatin, NK-104 (a.k.a. itavastatin, or nisvastatin or nisbastatin) and ZD-4522 (a.k.a. rosuvastatin, or atavastatin or visastatin)); squalene synthetase inhibitors; fibrates; bile acid sequestrants (such as questran); ACAT inhibitors; MTP inhibitors; lipooxygenase inhibitors; cholesterol absorption inhibitors; and cholesterol ester transfer protein inhibitors (e.g., CP-529414).

Examples of suitable anti-diabetic agents include: biguanides (e.g., metformin); glucosidase inhibitors (e.g., acarbose); insulins (including insulin secretagogues or insulin sensitizers); meglitinides (e.g., repaglinide); sulfonylureas (e.g., glimepiride, glyburide and glipizide); biguanide/glyburide combinations (e.g., glucovance), thiozolidinediones (e.g., troglitazone, rosiglitazone and pioglitazone), PPAR-alpha agonists, PPAR-gamma agonists, PPAR alpha/gamma dual agonists, SGLT2 inhibitors, inhibitors of fatty acid binding protein (aP2) such as those disclosed in WO00/59506, glucagon-like peptide-1 (GLP-1), and dipeptidyl peptidase IV (DP4) inhibitors.

Examples of suitable anti-coagulants for use in combination with the compounds of the present invention include heparins (e.g., unfractioned and low molecular weight heparins such as enoxaparin and dalteparin).

Particularly when provided as a single dosage unit, the potential exists for a chemical interaction between the combined active ingredients. For this reason, when apixaban and a second therapeutic agent are combined in a single dosage unit they are formulated such that although the active ingredients are combined in a single dosage unit, the physical contact between the active ingredients is minimized (that is, reduced). For example, one active ingredient may be enteric coated. By enteric coating one of the active ingredients, it is possible not only to minimize the contact between the combined active ingredients, but also, it is possible to control the release of one of these components in the gastrointestinal tract such that one of these components is not released in the stomach but rather is released in the intestines. One of the active ingredients may also be coated with a material that affects a sustained-release throughout the gastrointestinal tract and also serves to minimize physical contact between the combined active ingredients. Furthermore, the sustained-released component can be additionally enteric coated such that the release of this component occurs only in the intestine. Still another approach would involve the formulation of a combination product in which the one component is coated with a sustained and/or enteric release polymer, and the other component is also coated with a polymer such as a low viscosity grade of hydroxypropyl methylcellulose (HPMC) or other appropriate materials as known in the art, in order to further separate the active components. The polymer coating serves to form an additional barrier to interaction with the other component.

These as well as other ways of minimizing contact between the components of combination products of the present invention, whether administered in a single dosage form or administered in separate forms but at the same time by the same manner, will be readily apparent to those skilled in the art, once armed with the present disclosure.

Solubility-Improved Forms

The solubility-improved form of apixaban is any form that is capable of supersaturating, at least temporarily, in an aqueous use environment by a factor of about 1.25-fold or more, relative to the solubility of crystalline apixaban. That is, the solubility-improved form provides a maximum dissolved drug concentration (MDC) of apixaban in a use environment that is at least 1.25-fold the equilibrium drug concentration provided by the crystalline form of apixaban alone. Preferably, the solubility-improved form increases the MDC of apixaban in aqueous solution by at least 2-fold relative to a control composition, more preferably by at least 3-fold, and most preferably by at least 5-fold.

Alternatively, the solubility-improved form provides an area under the drug concentration versus time curve ("AUC") in the use environment that may be at least 1.25-fold that provided by a control composition. The AUC is the integration of a plot of the drug concentration versus time. When the use environment is in vitro, the AUC can be determined by plotting the drug concentration in the test solution over time or for in vivo tests by plotting the drug concentration in the in vivo use environment (such as the GI tract of an animal) over time. The calculation of an AUC is a well-known procedure in the pharmaceutical arts and is described, for example, in Welling, "Pharmacokinetics Processes and Mathematics," ACS Monograph 185 (1986). More specifically, in the environment of use, apixaban in solubility-improved form provides an AUC for any 90-minute period of from about 0 to about 270 minutes following introduction to the use environment that is at least 1.25-fold that of a control composition. The control composition is conventionally the lowest-energy crystalline form of apixaban alone without any solubilizing additives. It is to be understood that the control composition is free from solubilizers or other components that would materially affect the solubility of apixaban, and that apixaban is in solid form in the control composition. The control composition is conventionally the lowest energy or most stable crystalline form of apixaban alone, otherwise referred to hereinafter as apixaban in "bulk crystalline form." Preferably, the AUC provided by the solubility-improved form is at least 2-fold, more preferably at least 3-fold that of the control composition. For apixaban, the solubility-improved form may provide an AUC value that is at least 5-fold, at least 7-fold, at least 10-fold, and even more than 250-fold that of the control described above.

The solubility-improved form may comprise a solid amorphous dispersion of apixaban in a concentration-enhancing polymer or low molecular weight water-soluble material. Solid amorphous dispersions of apixaban and concentration-enhancing polymers are disclosed by analogy in commonly assigned U.S. Pat. Nos. 7,115,279, and 7,235,259 both of which are herein incorporated by reference. Alternatively, the solubility-improved form may comprise amorphous apixaban. The solubility-improved form may comprise nanoparticles, i.e. solid apixaban particles of diameter less than approximately 900 nm, optionally stabilized by small quantities of surfactants or polymers, as analogously described in U.S. Pat. No. 5,145,684. The solubility-improved form may comprise adsorbates of apixaban in a crosslinked polymer, as analogously described in U.S. Pat. No. 5,225,192. The solubility-improved form may comprise a nanosuspension, the nanosuspension being a disperse system of solid-in-liquid or solid-in-semisolid, the dispersed phase comprising pure apixaban or an apixaban mixture, as analogously described in U.S. Pat. No. 5,858,410. The solubility-improved form may comprise apixaban that is in a supercooled form, as analogously described in U.S. Pat. No. 6,197,349. The solubility-improved form may comprise an apixaban/cyclodextrin form, including those analogously described in U.S. Pat. Nos. 5,134,127, 6,046,177, 5,874,418, and 5,376,645. The solubility-improved form may comprise a softgel form, such as a apixaban mixed with a lipid or colloidal protein (e.g., gelatin), including those analogously described in U.S. Pat. Nos. 5,851,275, 5,834,022 and 5,686,133. The solubility-improved form may comprise a self-emulsifying form, including those described analogously in U.S. Pat. Nos. 6,054,136 and 5,993,858. The solubility-improved form may comprise a three-phase drug form, including those described analogously in U.S. Pat. No. 6,042,847. The above solubility-improved forms may also be mixed with a concentration-enhancing polymer to provide improved solubility enhancements, as disclosed in commonly assigned copending U.S. Patent Application Publication 2003-0072801, which is incorporated in its entirety by reference. The solubility-improved form may also comprise (1) a high-energy crystalline form of Apixaban; (2) a hydrate or solvate crystalline form of a apixaban; (3) an amorphous form of apixaban (for apixaban that may exist as either amorphous or crystalline); (4) a mixture of apixaban (amorphous or crystalline) and a solubilizing agent; or (5) a solution of apixaban dissolved in an aqueous or organic liquid. The above solubility-improved forms may also be mixed with a concentration-enhancing polymer to provide improved solubility enhancements, as disclosed in U.S. Patent Application publication 2002-0006443, which is incorporated in its entirety by reference. The solubility-improved form may also comprise (a) a solid dispersion comprising apixaban and a matrix, wherein at least a major portion of apixaban in the dispersion is amorphous; and (b) a concentration-enhancing polymer, as disclosed in U.S. Patent Application Publication 2009-0011024, which is incorporated in its entirety by reference. The solubility-improved form may also comprise a solid adsorbate comprising a low-solubility apixaban adsorbed onto a substrate, the substrate having a surface area of at least 20 m$^2$/g, and wherein at least a major portion of apixaban in the solid adsorbate is amorphous. The solid adsorbate may optionally comprise a concentration-enhancing polymer. The solid adsorbate may also be mixed with a concentration-enhancing polymer. Such solid adsorbates are disclosed in U.S. Patent Application Publication 2003-0054037, which is incorporated in its entirety by reference. The solubility-improved form may also comprise a apixaban formulated in a lipid vehicle of the type disclosed in commonly assigned copending U.S. Pat. No. 6,962,931, which is also incorporated in its entirety by reference.

The aqueous use environment can be either the in vivo environment, such as the GI tract of an animal, particularly a human, or the in vitro environment of a test solution, such as phosphate buffered saline (PBS) solution or Model Fasted Duodenal (MFD) solution.

The solubility-improved forms of apixaban used in the dosage forms of this invention provide enhanced concentration of the dissolved apixaban in in vitro dissolution tests. It has been determined that enhanced drug concentration in in vitro dissolution tests in MFD solution is a good indicator of in vivo performance and bioavailability. The following solubility-improved/enhanced drug concentration in vitro test is provided (in contrast to the (in vitro dosage form dissolution test) provided above. The MFD solution consists of an aqueous solution consisting of 20 mM Na$_2$HPO$_4$, 47 mM KH$_2$PO$_4$, 87 mM NaCl, and 0.2 mM KCl, adjusted to pH 6.5 with NaOH, in which is also present 7.3 mM sodium taurocholic acid and 1.4 mM of 1-palmitoyl-2-oleyl-sn-glycero-3-phosphocholine. In particular, apixaban in solubility-improved form can be dissolution-tested by adding it to MFD solution and agitating to promote dissolution.

The following in vitro test is used to determine if a composition is a solubility-improved form of apixaban. A sample of the crystalline apixaban alone is added with agitation to a sufficient quantity MFD solution to achieve the equilibrium concentration of apixaban. In a separate test, a sample of the test composition (e.g., apixaban in solubility-improved form) is added to the MFD solution, such that if all apixaban dissolved, the theoretical concentration of apixaban would exceed the equilibrium concentration of apixaban by a factor of at least 2, and preferably by a factor of at least 10. The measured MDC and/or aqueous AUC of the test composition in the test medium is then compared with the equilibrium concentration, and/or with the aqueous AUC of the control composition. In conducting such a dissolution test, the amount of test composition or control composition used is an amount such that if all of apixaban dissolved the apixaban concentration would be at least 2-fold, and preferably at least 100-fold that of the equilibrium concentration.

The concentration of dissolved apixaban is typically measured as a function of time by sampling the test medium and plotting apixaban concentration in the test medium vs. time so that the MDC can be ascertained. The MDC is taken to be the maximum value of dissolved apixaban measured over the duration of the test. The aqueous AUC is calculated by integrating the concentration versus time curve over any 90-minute time period between the time of introduction of the composition into the aqueous use environment (when time equals zero) and 270 minutes following introduction to the use environment (when time equals 270 minutes). Typically, when the composition reaches its MDC rapidly, in say less than about 30 minutes, the time interval used to calculate AUC is from time equals zero to time equals 90 minutes. However, if the AUC of a composition over any 90-minute time period described above meets the criterion of this invention, then the composition formed is considered to be within the scope of this invention.

To avoid large apixaban particulates that would give an erroneous determination, the test solution is either filtered or centrifuged. "Dissolved drug" is typically taken as that material that either passes a 0.45 μm syringe filter or, alternatively, the material that remains in the supernatant following centrifugation. Filtration can be conducted using a 13 mm, 0.45 μm polyvinylidene difluoride syringe filter sold by Scientific Resources under the trademark TITAN®. Centrifugation is typically carried out in a polypropylene microcentrifuge tube by centrifuging at 13,000 G for 60 seconds. Other similar filtration or centrifugation methods can be employed and useful results obtained. For example, using other types of microfilters may yield values somewhat higher or lower (±10-40%) than that obtained with the filter specified above but will still allow identification of preferred dispersions.

Alternatively, apixaban in solubility-improved form, when dosed orally to a human or other animal, provides an AUC in apixaban concentration in the blood (serum or plasma) that is at least about 1.25-fold, preferably at least about 2-fold, preferably at least about 3-fold, preferably at least about 4-fold, preferably at least about 6-fold, preferably at least about 10-fold, and even more preferably at least about 20-fold that observed when a control composition consisting of an equivalent quantity of apixaban in bulk crystalline form is dosed. It is noted that such compositions can also be said to have a relative bioavailability of from about 1.25-fold to about 20-fold that of the control composition.

Relative bioavailability of apixaban in solubility-improved form can be tested in vivo in animals or humans using conventional methods for making such a determination. An in vivo test, such as a crossover study, may be used to determine whether a composition of apixaban in solubility-improved form provides an enhanced relative bioavailability compared with a control composition as described above. In an in vivo crossover study a test composition of a apixaban in solubility-improved form is dosed to half a group of test subjects and, after an appropriate washout period (e.g., one week) the same subjects are dosed with a control composition that consists of an equivalent quantity of crystalline apixaban as the test composition. The other half of the group is dosed with the control composition first, followed by the test composition. The relative bioavailability is measured as the concentration in the blood (serum or plasma) versus time area under the curve (AUC) determined for the test group divided by the AUC in the blood provided by the control composition. Preferably, this test/control ratio is determined for each subject, and then the ratios are averaged over all subjects in the study. In vivo determinations of AUC can be made by plotting the serum or plasma concentration of drug along the ordinate (y-axis) against time along the abscissa (x-axis). To facilitate dosing, a dosing vehicle may be used to administer the dose. The dosing vehicle is preferably water, but may also contain materials for suspending the test or control composition, provided these materials do not dissolve the composition or change the drug solubility in vivo.

Solid Amorphous Dispersions of Apixaban

In one embodiment, apixaban in a solubility-improved form comprises a solid amorphous dispersion of apixaban and a concentration-enhancing polymer. By solid amorphous dispersion is meant a solid material in which at least a portion of apixaban is in the amorphous form and dispersed in the polymer. Preferably, at least a major portion of apixaban in the solid amorphous dispersion is amorphous. By "amorphous" is meant simply that apixaban is in a non-crystalline state. As used herein, the term "a major portion" of apixaban means that at least 60 wt % of the drug in the solid amorphous dispersion is in the amorphous form, rather than the crystalline form. Preferably, apixaban in the solid amorphous dispersion is substantially amorphous. As used herein, "substantially amorphous" means that the amount of apixaban in crystalline form does not exceed about 25 wt %. More preferably, apixaban in the solid amorphous dispersion is "almost completely amorphous," meaning that the amount of apixaban in the crystalline form does not exceed about 10 wt %. Amounts of crystalline apixaban may be measured by Powder X-Ray Diffraction (PXRD), Scanning Electron Microscope (SEM) analysis, differential scanning calorimetry (DSC), or any other standard quantitative measurement.

The solid amorphous dispersions may contain from about 1 to about 80 wt % apixaban, depending on the dose of apixaban and the effectiveness of the concentration-enhancing polymer. Enhancement of aqueous apixaban concentrations and relative bioavailability are typically best at low apixaban levels, typically less than about 25 to about 40 wt %. However, due to the practical limit of the dosage form size, higher apixaban levels may be preferred and in many cases perform well.

The amorphous apixaban can exist within the solid amorphous dispersion in relatively pure amorphous drug domains or regions, as a solid solution of drug homogeneously distributed throughout the polymer or any combination of these states or those states that lie intermediate between them. The solid amorphous dispersion is preferably substantially homogeneous so that the amorphous apixaban is dispersed as homogeneously as possible throughout the polymer. As used herein, "substantially homogeneous" means that the fraction of apixaban that is present in relatively pure amorphous drug domains or regions within the solid amorphous dispersion is relatively small, on the order of less than 20 wt %, and preferably less than 10 wt % of the total amount of drug. Solid amorphous dispersions that are substantially homogeneous generally are more physically stable and have improved concentration-enhancing properties and, in turn, improved bioavailability, relative to nonhomogeneous dispersions.

In cases where apixaban and the polymer have glass transition temperatures sufficiently far apart (greater than about 20° C.), the fraction of drug that is present in relatively pure amorphous drug domains or regions within the solid amorphous dispersion can be determined by examining the glass transition temperature ($T_g$) of the solid amorphous dispersion. $T_g$ as used herein is the characteristic temperature where a glassy material, upon gradual heating, undergoes a relatively rapid (e.g., in 10 to 100 seconds) physical change from a glassy state to a rubbery state. The $T_g$ of an amorphous material such as a polymer, drug, or dispersion can be measured by several techniques, including by a dynamic mechanical analyzer (DMA), a dilatometer, a dielectric analyzer, and by DSC. The exact values measured by each technique can vary somewhat, but usually fall within 10° to 30° C. of each other. When the solid amorphous dispersion exhibits a single $T_g$, the amount of Apixaban in pure amorphous drug domains or regions in the solid amorphous dispersion is generally less than about 10 wt %, confirming that the solid amorphous dispersion is substantially homogeneous. This is in contrast to a simple physical mixture of pure amorphous drug particles and pure amorphous polymer particles which generally display two distinct $T_g$s, one being that of the drug and one that of the polymer. For a solid amorphous dispersion that exhibits two distinct $T_g$s, one in the proximity of the drug $T_g$ and one of the remaining drug/polymer dispersion, at least a portion of the drug is present in relatively pure amorphous domains. The amount of apixaban present in relatively pure amorphous drug domains or regions may be determined by first preparing calibration standards of substantially homogeneous dispersions to determine $T_g$ of the solid amorphous dispersion versus drug loading in the dispersion. From these calibration data and the $T_g$ of the drug/polymer dispersion, the fraction of apixaban in relatively pure amorphous drug domains or regions can be determined. Alternatively, the amount of apixaban present in relatively pure amorphous drug domains or regions may be determined by comparing the magnitude of the heat capacity for the transition in the proximity of the drug $T_g$ with calibration standards consisting essentially of a physical mixture of amorphous drug and polymer. In either case, a solid amorphous dispersion is considered to be substantially homogeneous if the fraction of apixaban that is present in relatively pure amorphous drug domains or regions within the solid amorphous dispersion is less than 20 wt %, and preferably less than 10 wt % of the total amount of apixaban.

Concentration-Enhancing Polymers

Concentration-enhancing polymers suitable for use in the compositions of the present invention should be inert, in the sense that they do not chemically react with apixaban in an adverse manner, are pharmaceutically acceptable, and have at least some solubility in aqueous solution at physiologically relevant pHs (e.g. 1-8). The polymer can be neutral or ionizable, and should have an aqueous-solubility of at least 0.1 mg/mL over at least a portion of the pH range of 1-8.

Concentration-enhancing polymers suitable for use with the present invention may be cellulosic or non-cellulosic. The polymers may be neutral or ionizable in aqueous solution. Of these, ionizable and cellulosic polymers are preferred, with ionizable cellulosic polymers being more preferred.

A preferred class of polymers comprises polymers that are "amphiphilic" in nature, meaning that the polymer has hydrophobic and hydrophilic portions. The hydrophobic portion may comprise groups such as aliphatic or aromatic hydrocarbon groups. The hydrophilic portion may comprise either ionizable or non-ionizable groups that are capable of hydrogen bonding such as hydroxyls, carboxylic acids, esters, amines or amides.

Amphiphilic and/or ionizable polymers are preferred because it is believed that such polymers may tend to have relatively strong interactions with apixaban and may promote the formation of the various types of polymer/drug assemblies in the use environment as described previously. In addition, the repulsion of the like charges of the ionized groups of such polymers may serve to limit the size of the polymer/drug assemblies to the nanometer or submicron scale. For example, while not wishing to be bound by a particular theory, such polymer/drug assemblies may comprise hydrophobic apixaban clusters surrounded by the polymer with the polymer's hydrophobic regions turned inward towards apixaban and the hydrophilic regions of the polymer turned outward toward the aqueous environment. Alternatively, depending on the specific chemical nature of apixaban, the ionized functional groups of the polymer may associate, for example, via ion pairing or hydrogen bonds, with ionic or polar groups of apixaban. In the case of ionizable polymers, the hydrophilic regions of the polymer would include the ionized functional groups. Such polymer/drug assemblies in solution may well resemble charged polymeric micellar-like structures. In any case, regardless of the mechanism of action, such amphiphilic polymers, particularly ionizable cellulosic polymers, have been shown to improve the MDC and/or AUC of apixaban in aqueous solution relative to control compositions free from such polymers (described in commonly assigned U.S. patent application Ser. No. 09/918,127, filed Jul. 31, 2001, which is incorporated herein by reference).

Surprisingly, such amphiphilic polymers can greatly enhance the maximum concentration of apixaban obtained when apixaban is dosed to a use environment. In addition, such amphiphilic polymers interact with apixaban to prevent the precipitation or crystallization of apixaban from solution despite its concentration being substantially above its equilibrium concentration. In particular, when the preferred compositions are solid amorphous dispersions of apixaban and the concentration-enhancing polymer, the compositions provide a greatly enhanced drug concentration, particularly when the dispersions are substantially homogeneous. The maximum drug concentration may be 10-fold and often more than 50-fold the equilibrium concentration of the crystalline apixaban. Such enhanced apixaban concentrations in turn lead to substantially enhanced relative bioavailability for apixaban.

One class of polymers suitable for use with the present invention comprises neutral non-cellulosic polymers. Exemplary polymers include: vinyl polymers and copolymers having substituents of hydroxyl, alkylacyloxy, or cyclicamido; polyvinyl alcohols that have at least a portion of their repeat units in the unhydrolyzed (vinyl acetate) form; polyvinyl alcohol polyvinyl acetate copolymers; polyvinyl pyrrolidone; polyoxyethylene-polyoxypropylene copolymers, also known as poloxamers; and polyethylene polyvinyl alcohol copolymers.

Another class of polymers suitable for use with the present invention comprises ionizable non-cellulosic polymers. Exemplary polymers include: carboxylic acid-functionalized vinyl polymers, such as the carboxylic acid functionalized polymethacrylates and carboxylic acid functionalized polyacrylates such as the EUDRAGITS® manufactured by Rohm Tech Inc., of Malden, Mass.; amine-functionalized polyacrylates and polymethacrylates; proteins; and carboxylic acid functionalized starches such as starch glycolate.

Non-cellulosic polymers that are amphiphilic are copolymers of a relatively hydrophilic and a relatively hydrophobic monomer. Examples include acrylate and methacrylate copolymers, and polyoxyethylene-polyoxypropylene copolymers. Exemplary commercial grades of such copolymers include the EUDRAGITS, which are copolymers of methacrylates and acrylates, and the PLURONICS supplied by BASF, which are polyoxyethylene-polyoxypropylene copolymers.

A preferred class of polymers comprises ionizable and neutral cellulosic polymers with at least one ester- and/or ether-linked substituent in which the polymer has a degree of substitution of at least 0.1 for each substituent.

It should be noted that in the polymer nomenclature used herein, ether-linked substituents are recited prior to "cellulose" as the moiety attached to the ether group; for example, "ethylbenzoic acid cellulose" has ethoxybenzoic acid substituents. Analogously, ester-linked substituents are recited after "cellulose" as the carboxylate; for example, "cellulose phthalate" has one carboxylic acid of each phthalate moiety ester-linked to the polymer and the other carboxylic acid unreacted.

It should also be noted that a polymer name such as "cellulose acetate phthalate" (CAP) refers to any of the family of cellulosic polymers that have acetate and phthalate groups attached via ester linkages to a significant fraction of the cellulosic polymer's hydroxyl groups. Generally, the degree of substitution of each substituent group can range from 0.1 to 2.9 as long as the other criteria of the polymer are met. "Degree of substitution" refers to the average number of the three hydroxyls per saccharide repeat unit on the cellulose chain that have been substituted. For example, if all of the hydroxyls on the cellulose chain have been phthalate substituted, the phthalate degree of substitution is 3. Also included within each polymer family type are cellulosic polymers that have additional substituents added in relatively small amounts that do not substantially alter the performance of the polymer.

Amphiphilic cellulosics comprise polymers in which the parent cellulosic polymer has been substituted at any or all of the 3 hydroxyl groups present on each saccharide repeat unit with at least one relatively hydrophobic substituent. Hydrophobic substituents may be essentially any substituent that, if substituted to a high enough level or degree of substitution, can render the cellulosic polymer essentially aqueous insoluble. Examples of hydrophobic substituents include ether-linked alkyl groups such as methyl, ethyl, propyl, butyl, etc.; or ester-linked alkyl groups such as acetate, propionate, butyrate, etc.; and ether- and/or ester-linked aryl groups such as phenyl, benzoate, or phenylate. Hydrophilic regions of the polymer can be either those portions that are relatively unsubstituted, since the unsubstituted hydroxyls are themselves relatively hydrophilic, or those regions that are substituted with hydrophilic substituents. Hydrophilic substituents include ether- or ester-linked nonionizable groups such as the hydroxy alkyl substituents hydroxyethyl, hydroxypropyl, and the alkyl ether groups such as ethoxyethoxy or methoxyethoxy. Particularly preferred hydrophilic substituents are those that are ether- or ester-linked ionizable groups such as carboxylic acids, thiocarboxylic acids, substituted phenoxy groups, amines, phosphates or sulfonates.

One class of cellulosic polymers comprises neutral polymers, meaning that the polymers are substantially non-ionizable in aqueous solution. Such polymers contain non-ionizable substituents, which may be either ether-linked or ester-linked. Exemplary ether-linked non-ionizable substituents include: alkyl groups, such as methyl, ethyl, propyl, butyl, etc.; hydroxy alkyl groups such as hydroxymethyl, hydroxyethyl, hydroxypropyl, etc.; and aryl groups such as phenyl. Exemplary ester-linked non-ionizable substituents include: alkyl groups, such as acetate, propionate, butyrate, etc.; and aryl groups such as phenylate. However, when aryl groups are included, the polymer may need to include a sufficient amount of a hydrophilic substituent so that the polymer has at least some water solubility at any physiologically relevant pH of from 1 to 8.

Exemplary non-ionizable polymers that may be used as the polymer include: hydroxypropyl methyl cellulose acetate, hydroxypropyl methyl cellulose, hydroxypropyl cellulose, methyl cellulose, hydroxyethyl methyl cellulose, hydroxyethyl cellulose acetate, and hydroxyethyl ethyl cellulose.

A preferred set of neutral cellulosic polymers are those that are amphiphilic. Exemplary polymers include hydroxypropyl methyl cellulose and hydroxypropyl cellulose acetate, where cellulosic repeat units that have relatively high numbers of methyl or acetate substituents relative to the unsubstituted hydroxyl or hydroxypropyl substituents constitute hydrophobic regions relative to other repeat units on the polymer. Neutral polymers suitable for use in the solid amorphous dispersions of the present invention are more fully disclosed in commonly assigned pending U.S. patent application Ser. No. 10/175,132, filed Jun. 18, 2002, herein incorporated by reference.

A preferred class of cellulosic polymers comprises polymers that are at least partially ionizable at physiologically relevant pH and include at least one ionizable substituent, which may be either ether-linked or ester-linked. Exemplary ether-linked ionizable substituents include: carboxylic acids, such as acetic acid, propionic acid, benzoic acid, salicylic acid, alkoxybenzoic acids such as ethoxybenzoic acid or propoxybenzoic acid, the various isomers of alkoxyphthalic acid such as ethoxyphthalic acid and ethoxyisophthalic acid, the various isomers of alkoxynicotinic acid such as ethoxynicotinic acid, and the various isomers of picolinic acid such as ethoxypicolinic acid, etc.; thiocarboxylic acids, such as thioacetic acid; substituted phenoxy groups, such as hydroxyphenoxy, etc.; amines, such as aminoethoxy, diethylaminoethoxy, trimethylaminoethoxy, etc.; phosphates, such as phosphate ethoxy; and sulfonates, such as sulphonate ethoxy. Exemplary ester linked ionizable substituents include: carboxylic acids, such as succinate, citrate, phthalate, terephthalate, isophthalate, trimellitate, and the various isomers of pyridinedicarboxylic acid, etc.; thiocarboxylic acids, such as thiosuccinate; substituted phenoxy groups, such as amino salicylic acid; amines, such as natural or synthetic amino acids, such as alanine or phenylalanine; phosphates, such as acetyl phosphate; and sulfonates, such as acetyl sulfonate. For aromatic-substituted polymers to also have the requisite aqueous solubility, it is also desirable that sufficient hydrophilic groups such as hydroxypropyl or carboxylic acid functional groups be attached to the polymer to render the polymer aqueous soluble at least at pH values where any ionizable groups are ionized. In some cases, the aromatic group may itself be ionizable, such as phthalate or trimellitate substituents.

Exemplary cellulosic polymers that are at least partially ionized at physiologically relevant pHs include: hydroxypropyl methyl cellulose acetate succinate, hydroxypropyl methyl cellulose succinate, hydroxypropyl cellulose acetate succinate, hydroxyethyl methyl cellulose succinate, hydroxyethyl cellulose acetate succinate, hydroxypropyl methyl cellulose phthalate, hydroxyethyl methyl cellulose acetate succinate, hydroxyethyl methyl cellulose acetate phthalate, carboxyethyl cellulose, carboxymethyl cellulose, carboxymethyl ethyl cellulose, cellulose acetate phthalate, methyl cellulose acetate phthalate, ethyl cellulose acetate phthalate, hydroxypropyl cellulose acetate phthalate, hydroxypropyl methyl cellulose acetate phthalate, hydroxypropyl cellulose acetate phthalate succinate, hydroxypropyl methyl cellulose acetate succinate phthalate, hydroxypropyl methyl cellulose succinate phthalate, cellulose propionate phthalate, hydroxypropyl cellulose butyrate phthalate, cellulose acetate trimellitate, methyl cellulose acetate trimellitate, ethyl cellulose acetate trimellitate, hydroxypropyl cellulose acetate trimellitate, hydroxypropyl methyl cellulose acetate trimellitate, hydroxypropyl cellulose acetate trimellitate succinate, cellulose propionate trimellitate, cellulose butyrate trimellitate, cellulose acetate terephthalate, cellulose acetate isophthalate, cellulose acetate pyridinedicarboxylate, salicylic acid cellulose acetate, hydroxypropyl salicylic acid cellulose acetate, ethylbenzoic acid cellulose acetate, hydroxypropyl ethylbenzoic acid cellulose acetate, ethyl phthalic acid cellulose acetate, ethyl nicotinic acid cellulose acetate, and ethyl picolinic acid cellulose acetate.

Exemplary cellulosic polymers that meet the definition of amphiphilic, having hydrophilic and hydrophobic regions include polymers such as cellulose acetate phthalate and cellulose acetate trimellitate where the cellulosic repeat units that have one or more acetate substituents are hydrophobic relative to those that have no acetate substituents or have one or more ionized phthalate or trimellitate substituents.

A particularly desirable subset of cellulosic ionizable polymers are those that possess both a carboxylic acid functional aromatic substituent and an alkylate substituent and thus are amphiphilic. Exemplary polymers include cellulose acetate phthalate, methyl cellulose acetate phthalate, ethyl cellulose acetate phthalate, hydroxypropyl cellulose acetate phthalate, hydroxypropyl methyl cellulose phthalate, hydroxypropyl methyl cellulose acetate phthalate, hydroxypropyl cellulose acetate phthalate succinate, cellulose propionate phthalate, hydroxypropyl cellulose butyrate phthalate, cellulose acetate trimellitate, methyl cellulose acetate trimellitate, ethyl cellulose acetate trimellitate, hydroxypropyl cellulose acetate trimellitate, hydroxypropyl methyl cellulose acetate trimellitate, hydroxypropyl cellulose acetate trimellitate succinate, cellulose propionate trimellitate, cellulose butyrate trimellitate, cellulose acetate terephthalate, cellulose acetate isophthalate, cellulose acetate pyridinedicarboxylate, salicylic acid cellulose acetate, hydroxypropyl salicylic acid cellulose acetate, ethylbenzoic acid cellulose acetate, hydroxypropyl ethylbenzoic acid cellulose acetate, ethyl phthalic acid cellulose acetate, ethyl nicotinic acid cellulose acetate, and ethyl picolinic acid cellulose acetate.

Another particularly desirable subset of cellulosic ionizable polymers are those that possess a non-aromatic carboxylate substituent. Exemplary polymers include hydroxypropyl methyl cellulose acetate succinate, hydroxypropyl methyl cellulose succinate, hydroxypropyl cellulose acetate succinate, hydroxyethyl methyl cellulose acetate succinate, hydroxyethyl methyl cellulose succinate, hydroxyethyl cellulose acetate succinate, and carboxymethyl ethyl cellulose.

While, as listed above, a wide range of polymers may be used to form dispersions of apixaban, relatively hydrophobic polymers have shown the best performance as demonstrated by high MDC and AUC values. In particular, cellulosic polymers that are aqueous insoluble in their nonionized state but are aqueous soluble in their ionized state perform particularly well. A particular subclass of such polymers are the so-called "enteric" polymers, which include, for example, certain grades of hydroxypropyl methyl cellulose phthalate and cellulose acetate trimellitate. Dispersions formed from such polymers generally show very large enhancements, on the order of 50-fold to over 1000-fold, in the maximum drug concentration achieved in dissolution tests relative to that for a crystalline drug control. In addition, non-enteric grades of such polymers as well as closely related cellulosic polymers are expected to perform well due to the similarities in physical properties within the apixaban class.

Thus, especially preferred polymers are hydroxypropyl methyl cellulose acetate succinate (HPMCAS), hydroxypropyl methyl cellulose phthalate (HPMCP), cellulose acetate phthalate (CAP), cellulose acetate trimellitate (CAT), methyl cellulose acetate phthalate, hydroxypropyl cellulose acetate phthalate, cellulose acetate terephthalate, cellulose acetate isophthalate, and carboxymethyl ethyl cellulose. The most preferred ionizable cellulosic polymers are hydroxypropyl methyl cellulose acetate succinate, hydroxypropyl methyl cellulose phthalate, cellulose acetate phthalate, cellulose acetate trimellitate, and carboxymethyl ethyl cellulose.

One particularly effective polymer for forming dispersions of the present invention is carboxymethyl ethyl cellulose (CMEC). Dispersions made from apixaban and CMEC typically have high glass-transition temperatures at high relative humidities, due to the high glass-transition temperature of CMEC. As discussed below, such high $T_g$s result in solid amorphous dispersions with excellent physical stability. In addition, because all of the substituents on CMEC are attached to the cellulose backbone through ether linkages, CMEC has excellent chemical stability. Additionally, commercial grades of CMEC, such as that provided by Freund Industrial Company, Limited (Tokyo, Japan), are amphiphilic, leading to high degrees of concentration enhancement. Finally, hydrophobic Apixaban often have a high solubility in CMEC allowing for formation of physically stable dispersions with high drug loadings.

A particularly effective concentration-enhancing polymer for use with apixaban is HPMCAS. Even more preferred is HPMCAS-HG. The HPMCAS-HG grade (AQOAT-HG) manufactured by Shin Etsu, Tokyo, Japan (the "G" standing for granular) provides enteric protection up to a pH of about 6.8

While specific polymers have been discussed as being suitable for use in the compositions of the present invention, blends of such polymers may also be suitable. Thus the term "polymer" is intended to include blends of polymers in addition to a single species of polymer.

To obtain the best performance, particularly upon storage for long times prior to use, it is preferred that apixaban remain, to the extent possible, in the amorphous state. This is best achieved when the glass-transition temperature, $T_g$, of the amorphous apixaban material is substantially above the storage temperature of the composition. In particular, it is preferable that the $T_g$ of the amorphous state of apixaban be at least 40° C. and preferably at least 60° C. However, this is not always the case. For example, the $T_g$ of amorphous apixaban is about 30° C. For those aspects of the invention in which the composition is a solid, substantially amorphous dispersion of a apixaban in the concentration-enhancing polymer, it is preferred that the concentration-enhancing polymer have a $T_g$ of at least 40° C., preferably at least 70° C. and more preferably greater than 100° C. Exemplary high $T_g$ polymers include HPMCAS, HPMCP, CAP, CAT, CMEC and other cellulosics that have alkylate or aromatic substituents or both alkylate and aromatic substituents.

Another preferred class of polymers consists of neutralized acidic polymers. By "neutralized acidic polymer" is meant any acidic polymer for which a significant fraction of the "acidic moieties" or "acidic substituents" have been "neutralized"; that is, exist in their deprotonated form. By "acidic polymer" is meant any polymer that possesses a significant number of acidic moieties. In general, a significant number of acidic moieties would be greater than or equal to about 0.1 milliequivalents of acidic moieties per gram of polymer. "Acidic moieties" include any functional groups that are sufficiently acidic that, in contact with or dissolved in water, can at least partially donate a hydrogen cation to water and thus increase the hydrogen-ion concentration. This definition includes any functional group or "substituent," as it is termed when the functional group is covalently attached to a polymer that has a pKa of less than about 10. Exemplary classes of functional groups that are included in the above description include carboxylic acids, thiocarboxylic acids, phosphates, phenolic groups, and sulfonates. Such functional groups may make up the primary structure of the polymer such as for polyacrylic acid, but more generally are covalently attached to the backbone of the parent polymer and thus are termed "substituents." Neutralized acidic polymers are described in more detail in commonly assigned copending U.S. patent application Ser. No. 10/175,566 entitled "Pharmaceutical Compositions of Drugs and Neutralized Acidic Polymers" filed Jun. 17, 2002, the relevant disclosure of which is incorporated by reference.

In addition, the preferred polymers listed above, that is amphiphilic cellulosic polymers, tend to have greater concentration-enhancing properties relative to the other polymers of the present invention. Generally those concentration-enhancing polymers that have ionizable substituents tend to perform best. In vitro tests of compositions with such polymers tend to have higher MDC and AUC values than compositions with other polymers of the invention.

Preparation of Dispersions

The solid amorphous dispersions of apixaban and concentration-enhancing polymer may be made according to any conventional process for forming solid amorphous dispersions that results in at least a major portion (at least 70%) of apixaban being in the amorphous state. Such processes include mechanical, thermal and solvent processes. Exemplary mechanical processes include milling and extrusion;

melt processes including high temperature fusion, solvent-modified fusion and melt-congeal processes; and solvent processes including non-solvent precipitation, spray-coating and spray-drying. See, for example, the following U.S. Patents, the pertinent disclosures of which are incorporated herein by reference: U.S. Pat. Nos. 5,456,923 and 5,939,099, which describe forming dispersions by extrusion processes; U.S. Pat. Nos. 5,340,591 and 4,673,564, which describe forming dispersions by milling processes; and U.S. Pat. Nos. 5,707,646 and 4,894,235, which describe forming dispersions by melt congeal processes.

In one embodiment the solid amorphous dispersions is formed by "solvent processing," which consists of dissolution of apixaban and one or more polymers in a common solvent. "Common" here means that the solvent, which can be a mixture of compounds, will dissolve both apixaban and the polymer(s). After both apixaban and the polymer have been dissolved, the solvent is rapidly removed by evaporation or by mixing with a non-solvent. Exemplary processes are spray-drying, spray-coating (pan-coating, fluidized bed coating, etc.), and precipitation by rapid mixing of the polymer and apixaban solution with $CO_2$, water, or some other non-solvent. Preferably, removal of the solvent results in the formation of a substantially homogeneous, solid amorphous dispersion. In such dispersions, apixaban is dispersed as homogeneously as possible throughout the polymer and can be thought of as a solid solution of apixaban dispersed in the polymer(s), wherein the solid amorphous dispersion is thermodynamically stable, meaning that the concentration of apixaban in the polymer is at or below its equilibrium value, or it may be considered to be a supersaturated solid solution where apixaban concentration in the concentration-enhancing polymer(s) is above its equilibrium value.

The solvent may be removed by spray-drying. The term "spray-drying" is used conventionally and broadly refers to processes involving breaking up liquid mixtures into small droplets (atomization) and rapidly removing solvent from the mixture in a spray-drying apparatus where there is a strong driving force for evaporation of solvent from the droplets. Spray-drying processes and spray-drying equipment are described generally in Perry's Chemical Engineers' Handbook, pages 20-54 to 20-57 (Sixth Edition 1984). More details on spray-drying processes and equipment are reviewed by Marshall, "Atomization and Spray-Drying," 50 Chem. Eng. Prog. Monogr. Series 2 (1954), and Masters, Spray Drying Handbook (Fourth Edition 1985). The strong driving force for solvent evaporation is generally provided by maintaining the partial pressure of solvent in the spray-drying apparatus well below the vapor pressure of the solvent at the temperature of the drying droplets. This is accomplished by (1) maintaining the pressure in the spray-drying apparatus at a partial vacuum (e.g., 0.01 to 0.50 atm); or (2) mixing the liquid droplets with a warm drying gas; or (3) both (1) and (2). In addition, at least a portion of the heat required for evaporation of solvent may be provided by heating the spray solution.

Solvents suitable for spray-drying can be any organic compound in which apixaban and polymer are mutually soluble. Preferably, the solvent is also volatile with a boiling point of 150° C. or less. In addition, the solvent should have relatively low toxicity and be removed from the solid amorphous dispersion to a level that is acceptable according to The International Committee on Harmonization (ICH) guidelines. Removal of solvent to this level may require a subsequent processing step such as tray-drying. Preferred solvents include alcohols such as methanol, ethanol, n-propanol, iso-propanol, and butanol; ketones such as acetone, methyl ethyl ketone and methyl iso-butyl ketone; esters such as ethyl acetate and propylacetate; and various other solvents such as acetonitrile, methylene chloride, toluene, and 1,1,1-trichloroethane. Lower volatility solvents such as dimethyl acetamide or dimethylsulfoxide can also be used. Mixtures of solvents, such as 50% methanol and 50% acetone, can also be used, as can mixtures with water, so long as the polymer and apixaban are sufficiently soluble to make the spray-drying process practicable. Generally, due to the low-solubility of apixaban, non-aqueous solvents are preferred, meaning that the solvent comprises less than about 10 wt % water.

The solvent-bearing feed, comprising apixaban and the concentration-enhancing polymer, can be spray-dried under a wide variety of conditions and yet still yield dispersions with acceptable properties. For example, various types of nozzles can be used to atomize the spray solution, thereby introducing the spray solution into the spray-dry chamber as a collection of small droplets. Essentially any type of nozzle may be used to spray the solution as long as the droplets that are formed are sufficiently small that they dry sufficiently (due to evaporation of solvent) that they do not stick to or coat the spray-drying chamber wall.

Although the maximum droplet size varies widely as a function of the size, shape and flow pattern within the spray-dryer, generally droplets should be less than about 500 μm in diameter when they exit the nozzle. Examples of types of nozzles that may be used to form the solid amorphous dispersions include the two-fluid nozzle, the fountain-type nozzle, the flat fan-type nozzle, the pressure nozzle and the rotary atomizer. In a preferred embodiment, a pressure nozzle is used, as disclosed in detail in U.S. Patent Application Publication 2003-085893, the disclosure of which is incorporated herein by reference.

The spray solution can be delivered to the spray nozzle or nozzles at a wide range of temperatures and flow rates. Generally, the spray solution temperature can range anywhere from just above the solvent's freezing point to about 20° C. above its ambient pressure boiling point (by pressurizing the solution) and in some cases even higher. Spray solution flow rates to the spray nozzle can vary over a wide range depending on the type of nozzle, spray-dryer size and spray-dry conditions such as the inlet temperature and flow rate of the drying gas. Generally, the energy for evaporation of solvent from the spray solution in a spray-drying process comes primarily from the drying gas.

The drying gas can, in principle, be essentially any gas, but for safety reasons and to minimize undesirable oxidation of apixaban or other materials in the solid amorphous dispersion, an inert gas such as nitrogen, nitrogen-enriched air or argon is utilized. The drying gas is typically introduced into the drying chamber at a temperature between about 60° and about 300° C. and preferably between about 80° and about 240° C.

The large surface-to-volume ratio of the droplets and the large driving force for evaporation of solvent leads to rapid solidification times for the droplets. Solidification times should be less than about 20 seconds, preferably less than about 10 seconds, and more preferably less than 1 second. This rapid solidification is often critical to the particles maintaining a uniform, homogeneous dispersion instead of separating into apixaban-rich and polymer-rich phases. In a preferred embodiment, the height and volume of the spray-dryer are adjusted to provide sufficient time for the droplets to dry prior to impinging on an internal surface of the spray-dryer, as described in detail in U.S. Pat. No. 6,763,607 incorporated herein by reference. As noted above, to get large enhancements in concentration and bioavailability it is often necessary to obtain as homogeneous a dispersion as possible.

Following solidification, the solid powder typically stays in the spray-drying chamber for about 5 to 60 seconds, further evaporating solvent from the solid powder. The final solvent content of the solid dispersion as it exits the dryer should be low, since this reduces the mobility of apixaban molecules in the solid amorphous dispersion, thereby improving its stability. Generally, the solvent content of the solid amorphous dispersion as it leaves the spray-drying chamber should be less than 10 wt % and preferably less than 2 wt %. Following formation, the solid amorphous dispersion can be dried to remove residual solvent using suitable drying processes, such as tray drying, fluid bed drying, microwave drying, belt drying, rotary drying, and other drying processes known in the art.

The solid amorphous dispersion is usually in the form of small particles. The mean size of the particles may be less than 500 μm in diameter, or less than 100 μm in diameter, less than 50 μm in diameter or less than 25 μm in diameter. When the solid amorphous dispersion is formed by spray-drying, the resulting dispersion is in the form of such small particles. When the solid amorphous dispersion is formed by other methods such by melt-congeal or extrusion processes, the resulting dispersion may be sieved, ground, or otherwise processed to yield a plurality of small particles.

Once the solid amorphous dispersion comprising apixaban and concentration-enhancing polymer has been formed, several processing operations can be used to facilitate incorporation of the dispersion into a dosage form. These processing operations include drying, granulation, and milling.

The solid amorphous dispersion may be granulated to increase particle size and improve handling of the dispersion while forming a suitable dosage form. Preferably, the average size of the granules will range from 50 to 1000 μm. Such granulation processes may be performed before or after the composition is dried, as described above. Dry or wet granulation processes can be used for this purpose. An example of a dry granulation process is roller compaction. Wet granulation processes can include so-called low shear and high shear granulation, as well as fluid bed granulation. In these processes, a granulation fluid is mixed with the composition after the dry components have been blended to aid in the formation of the granulated composition. Examples of granulation fluids include water, ethanol, isopropyl alcohol, n-propanol, the various isomers of butanol, and mixtures thereof.

If a wet granulation process is used, the granulated composition is often dried prior to further processing. Examples of suitable drying processes to be used in connection with wet granulation are the same as those described above. Where the solid amorphous dispersion is made by a solvent process, the composition can be granulated prior to removal of residual solvent. During the drying process, residual solvent and granulation fluid are concurrently removed from the composition.

Once the composition has been granulated, it may then be milled to achieve the desired particle size. Examples of suitable processes for milling the composition include hammer milling, ball milling, fluid-energy milling, roller milling, cutting milling, and other milling processes known in the art.

Processes for forming solid amorphous dispersions of apixaban and concentration-enhancing polymers are described by analogy in detail in U.S. Pat. Nos. 7,115,279 and 7,235,259 which are hereby incorporated by reference.

The solid amorphous dispersions of apixaban may be formulated into a controlled-release device using the methods outlined above.

Lipid Vehicle Formulations

In a separate aspect of the invention, apixaban in a solubility-improved form comprises apixaban and a lipophilic vehicle selected from a digestible oil, a lipophilic solvent (also referred to herein as a "cosolvent", whether or not another solvent is in fact present), a lipophilic surfactant, and mixtures of any two or more thereof. Embodiments include apixaban and: (1) the combination of a pharmaceutically acceptable digestible oil and a surfactant; (2) the combination of a pharmaceutically acceptable digestible oil and a lipophilic solvent that is miscible therewith; and (3) the combination of a pharmaceutically acceptable digestible oil, a lipophilic solvent, and a surfactant.

In one embodiment, the invention provides a composition of matter for increasing the oral bioavailability of apixaban. The composition comprises:
 1. apixaban;
 2. a cosolvent;
 3. a surfactant having an HLB of from 1 to not more than 8;
 4. a surfactant having an HLB of over 8 up to 20; and
 5. optionally, a digestible oil.

In such formulations, all of the excipients are pharmaceutically acceptable. The above composition is sometimes referred to herein as a "pre-concentrate", in reference to its function of forming a stable emulsion when gently mixed with water or other aqueous medium, usually gastrointestinal fluids. It is also referred to herein as a "fill", referring to its utility as a fill for a softgel capsule. Reference herein is frequently made to a softgel as a preferred dosage form for use with this invention, "softgel" being an abbreviation for soft gelatin capsules. It is understood that when reference is made to the term "softgel" alone, it shall be understood that the invention applies equally to all types of gelatin and non-gelatin capsules, regardless of hardness, softness, and so forth.

A cosolvent means a solvent which provides an increased solubility of apixaban in the lipid vehicle.

As noted above, and as discussed further below, a digestible oil can form a part of the pre-concentrate. If no other component of the pre-concentrate is capable of functioning as an emulsifiable oily phase, a digestible oil can be included as the oil which acts as a solvent for apixaban and which disperses to form the (emulsifiable) oil droplet phase once the pre-concentrate has been added to water. Some surfactants can serve a dual function, however, i.e., that of acting as a surfactant and also as a solvent and an oily vehicle for forming an oil-in-water emulsion. In the event such a surfactant is employed, and, depending on the amount used, a digestible oil may be required in less of an amount, or not required at all.

The pre-concentrate can be self-emulsifying or self-microemulsifying.

The term "self-emulsifying" refers to a formulation which, when diluted by a factor of at least 100 by water or other aqueous medium and gently mixed, yields an opaque, stable oil/water emulsion with a mean droplet diameter less than about 5 microns, but greater than 100 nm, and which is generally polydisperse. Such an emulsion is stable for at least several (i.e., for at least 6) hours, meaning there is no visibly detectable phase separation and that there is no visibly detectable crystallization of apixaban.

The term "self-microemulsifying" refers to a pre-concentrate which, upon at least 100× dilution with an aqueous medium and gentle mixing, yields a non-opaque, stable oil/water emulsion with an average droplet size of about 1 micron or less, said average particle size preferably being less than 100 nm. The particle size is primarily unimodal. Most preferably the emulsion is transparent and has a unimodal particle size distribution with a mean diameter less than 50 nm as determined, for example, by dynamic light scattering. The microemulsion is thermodynamically stable and without any indication of crystallization of apixaban.

"Gentle mixing" as used above is understood in the art to refer to the formation of an emulsion by gentle hand (or machine) mixing, such as by repeated inversions on a standard laboratory mixing machine. High shear mixing is not required to form the emulsion. Such pre-concentrates generally emulsify nearly spontaneously when introduced into the human (or other animal) gastrointestinal tract.

Combinations of 2 surfactants, one being a low HLB surfactant with an HLB of 1 to 8, the other being a high HLB surfactant with a higher HLB of over 8 to 20, preferably 9 to 20, can be employed to create the right conditions for efficient emulsification. The HLB, an acronym for "hydrophilic-lipophilic balance", is a rating scale that can range from 1-20 for non-ionic surfactants. The higher the HLB, the more hydrophilic the surfactant. Hydrophilic surfactants (HLB ca. 8-20), when used alone, provide fine emulsions which are, advantageously, more likely to empty uniformly from the stomach and provide a much higher surface area for absorption. Disadvantageously, however, limited miscibility of such high HLB surfactants with oils can limit their effectiveness, and thus a low HLB, lipophilic surfactant (HLB ca. 1-8) is also included. This combination of surfactants can also provide superior emulsification. A combination of a medium chain triglyceride (such as Miglyol® 812), Polysorbate 80 (HLB 15) and medium chain mono/diglycerides (Capmul® MCM, HLB=6) was found to be as efficient as Miglyol® 812 and a surfactant with an HLB of 10 (Labrafac® CM). N. H. Shah et al. Int. J. Pharm., vol 106, 15 (1994). The advantages of using combinations of high and low HLB surfactants for self-emulsifying systems, including promotion of lipolysis, have been demonstrated by Lacy, U.S. Pat. No. 6,096,338.

Suitable digestible oils, which can be used alone as the vehicle or in a vehicle that includes a digestible oil as part of a mixture, include medium chain triglycerides (MCT, C6-C12) and long chain triglycerides (LCT, C14-C20) and mixtures of mono-, di-, and triglycerides, or lipophilic derivatives of fatty acids such as esters with alkyl alcohols. Examples of preferred MCT's include fractionated coconut oils, such as Miglyol® 812, which is a 56% caprylic (C8) and 36% capric (C10) triglyceride, Miglyol® 810 (68% C8 and 28% C10), Neobee® M5, Captex® 300, Captex® 355, and Crodamol® GTCC. The Miglyols are supplied by Condea Vista Inc. (Huls), Neobee® by Stepan Europe, Voreppe, France, Captex® by Abitec Corp., and Crodamol® by Croda Corp. Examples of LCTs include vegetable oils such as soybean, safflower, corn, olive, cottonseed, arachis, sunflower seed, palm, or rapeseed. Examples of fatty acid esters of alkyl alcohols include ethyl oleate and glyceryl monooleate. Of the digestible oils MCT's are preferred, and Miglyol® 812 is most preferred.

The vehicle may also be a pharmaceutically acceptable solvent, for use alone, or as a cosolvent in a mixture. Suitable solvents include any solvent that is used to increase solubility of apixaban in the formulation in order to allow delivery of the desired dose per dosing unit. It is not generally possible to predict the solubility of apixaban in the individual solvents, but such can be easily determined by "trial runs". Suitable solvents include triacetin (1,2,3-propanetriyl triacetate or glyceryl triacetate available from Eastman Chemical Corp.) or other polyol esters of fatty acids, trialkyl citrate esters, propylene carbonate, dim ethyl isosorbide, ethyl lactate, N-methyl pyrrolidones, transcutol, glycofurol, peppermint oil, 1,2-propylene glycol, ethanol, and polyethylene glycols. Preferred as solvents are triacetin, propylene carbonate (Huntsman Corp.), transcutol (Gattefosse), ethyl lactate (Purac, Lincolnshire, Nebr.) and dimethylisosorbide (sold under the registered trademark ARLASOLVE DMI, ICI Americas). A hydrophilic solvent is more likely to migrate to the capsule shell and soften the shell, and, if volatile, its concentration in the composition can be reduced, but with a potential negative impact on active component (Apixaban) solubility. More preferred are the lipophilic solvents triacetin, ethyl lactate and propylene carbonate.

Hydrophilic surfactants having an HLB of 8-20, preferably having an HLB greater than 10, are particularly effective at reducing emulsion droplet particle size. Suitable choices include nonionic surfactants such as polyoxyethylene 20 sorbitan monooleate, polysorbate 80, sold under the trademark TWEEN 80, available commercially from ICI; polyoxyethylene 20 sorbitan monolaurate (Polysorbate 20, TWEEN 20); polyethylene (40 or 60) hydrogenated castor oil (available under the registered trademarks CREMOPHOR® RH40 and RH60 from BASF); polyoxyethylene (35) castor oil (CREMOPHOR® EL); polyethylene (60) hydrogenated castor oil (Nikkol® HCO-60); alpha tocopheryl polyethylene glycol 1000 succinate (Vitamin E TPGS); glyceryl PEG 8 caprylate/caprate (available commercially under the registered trademark LABRASOL® from Gattefosse); PEG 32 glyceryl laurate (sold commercially under the registered trademark GELUCIRE® 44/14 by Gattefosse), polyoxyethylene fatty acid esters (available commercially under the registered trademark MYRJ from ICI), polyoxyethylene fatty acid ethers (available commercially under the registered trademark BRIJ from ICI). Preferred are Polysorbate 80, CREMOPHOR® RH40 (BASF), and Vitamin E TPGS (Eastman).

Lipophilic surfactants having an HLB of less than 8 are useful for achieving a balance of polarity to provide a stable emulsion, and have also been used to reverse the lipolysis inhibitory effect of hydrophilic surfactants. Suitable lipophilic surfactants include mono and diglycerides of capric and caprylic acid under the following registered trademarks: Capmul® MCM, MCM 8, and MCM 10, available commercially from Abitec; and Imwitor® 988, 742 or 308, available commercially from Condea Vista; polyoxyethylene 6 apricot kernel oil, available under the registered trademark Labrafil® M 1944 CS from Gattefosse; polyoxyethylene corn oil, available commercially as Labrafil® M 2125; propylene glycol monolaurate, available commercially as Lauroglycol from Gattefosse; propylene glycol dicaprylate/caprate available commercially as Captex® 200 from Abitec or Miglyol® 840 from Condea Vista, polyglyceryl oleate available commercially as Plurol oleique from Gattefosse, sorbitan esters of fatty acids (e.g. Span® 20, Crill® 1, Crill® 4, available commercially from ICI and Croda), and glyceryl monooleate (Maisine, Peceol). Preferred from this class are Capmul® MCM (Abitec Corp.) and Labrafil® M1944 CS (Gattefosse).

In addition to the main liquid formulation ingredients previously noted, other stabilizing additives, as conventionally known in the art of softgel formulation, can be introduced to the fill as needed, usually in relatively small quantities, such as antioxidants (BHA, BHT, tocopherol, propyl gallate, etc.) and other preservatives such as benzyl alcohol or parabens.

The composition can be formulated as a fill encapsulated in a soft gelatin capsule, a hard gelatin capsule with an appropriate seal, a non-gelatin capsule such as a hydroxypropyl methylcellulose capsule or an oral liquid or emulsion by methods commonly employed in the art. The fill is prepared by mixing the excipients and apixaban with heating if required.

The ratio of apixaban, digestible oil, cosolvent, and surfactants depends upon the efficiency of emulsification and the solubility, and the solubility depends on the dose per capsule that is desired. A self-emulsifying formulation is generally useful if the primary goals are to deliver a high dose per softgel (at least 60 mg) with, generally, a much lower food effect than with an oil solution alone. In general, softgel preconcentrates having solubilities of apixaban of at least 140 mg/mL in the preconcentrate, and thus requiring higher amounts of cosolvent and lower levels of surfactants and oil, are preferred.

In general, the following ranges, in weight percent, of the components for a self-emulsifying formulation of apixaban are:
1-50% apixaban
5-60% cosolvent
5-75% high HLB surfactant
5-75% low HLB surfactant Preferred ranges that have advantageously low food effects include those stated immediately below:
1-33% apixaban
0-30% digestible oil
15-55% cosolvent
5-40% high HLB surfactant
10-50% low HLB surfactant General ranges, in weight percent, for the components for a self-microemulsifying formulation of apixaban are:
1-40% apixaban
5-65% digestible oil
5-60% cosolvent
10-75% high HLB surfactant
5-75% low HLB surfactant By analogy further details of such lipid vehicle formulations are disclosed in U.S. Pat. No. 6,962,931 which is incorporated in its entirety by reference.

Such lipid vehicle formulations can be formulated into controlled-release devices, such as those described above.

Methods of Treatment

The dosage forms of the present invention may be used to treat any condition, which is subject to treatment by administering apixaban, as disclosed in U.S. Pat. No. 6,967,208.

In one aspect, the dosage forms of the present invention are used for preventing or treating thromboembolic disorders in the chambers of the heart.

Accordingly apixaban is useful as an anticoagulant for the treatment or prevention of thromboembolic disorders in mammals (e.g., factor Xa-associated disorders). In general, a thromboembolic disorder is a circulatory disease caused by blood clots (i.e., diseases involving fibrin formation, platelet activation, and/or platelet aggregation). The term "thromboembolic disorders" as used herein includes arterial cardiovascular thromboembolic disorders, venous cardiovascular thromboembolic disorders, and thromboembolic disorders in the chambers of the heart. The term "thromboembolic disorders" as used herein also includes specific disorders selected from, but not limited to, unstable angina or other acute coronary syndromes, first or recurrent myocardial infarction, ischemic sudden death, transient ischemic attack, stroke, atherosclerosis, peripheral occlusive arterial disease, venous thrombosis, deep vein thrombosis, thrombophlebitis, arterial embolism, coronary arterial thrombosis, cerebral arterial thrombosis, cerebral embolism, kidney embolism, pulmonary embolism, and thrombosis resulting from (a) prosthetic valves or other implants, (b) indwelling catheters, (c) stents, (d) cardiopulmonary bypass, (e) hemodialysis, or (f) other procedures in which blood is exposed to an artificial surface that promotes thrombosis. It is noted that thrombosis includes occlusion (e.g., after a bypass) and reocclusion (e.g., during or after percutaneous transluminal coronary angioplasty). The thromboembolic disorders may result from conditions including but not limited to atherosclerosis, surgery or surgical complications, prolonged immobilization, atrial fibrillation, congenital thrombophilia, cancer, diabetes, effects of medications or hormones, and complications of pregnancy. The anticoagulant effect of compounds of the present invention is believed to be due to inhibition of factor Xa or thrombin.

In one aspect, the dosage forms of the present invention are used for inhibiting the blood coagulation enzyme human Factor Xa.

In another aspect, the dosage forms of the present invention are used for preventing or treating venous thromboembolism.

In another aspect, the dosage forms of the present invention are used for preventing or treating deep vein thrombosis.

In another aspect, the dosage forms of the present invention are used for preventing or treating acute coronary syndrome.

In another aspect, the dosage forms of the present invention are used for preventing or treating arterial thrombosis.

The above preventions and methods may be attendant to surgery such as knee surgery, hip replacement hip fracture repair, lower extremity arthroscopic surgery, bariatric surgery, cardiac surgery (in adults and children, including cardiac bypass, cardiac valve operations, congenital heart repair), transplant surgery, spine surgery, abdominal and pelvic surgical procedures (including cancer surgery), and thoracic surgical procedures etc.

The amount of apixaban present in the dosage form will vary depending on the desired dose which can depend for example, on the condition being treated. For example, the desired dose for apixaban ranges from 1 mg/day to 100 mg/day, preferably 5 mg/day to 25 mg/day, most preferably 5 mg/day to 15 mg/day, typically 5 mg/day or 10 mg/day, however dosages of 5, 6, 7, 8, 9, 10, 11, 12, 13, 14, or 15 mg/day may be used. The total daily dose may be administered in single or divided doses and may, at the physician's discretion, fall outside of the typical ranges given herein. These dosages are based on an average human subject having a weight of about 60 kg to 70 kg. The physician will readily be able to determine doses for subjects whose weight falls outside this range, such as infants and the elderly. It is to be further understood that for any particular subject, specific dosage regimens should be adjusted over time according to the individual need and the professional judgment of the person administering or supervising the administration of the compositions, and that dosage ranges set forth herein are exemplary only and are not intended to limit the scope or practice of the claimed composition. For example, doses may be adjusted based on pharmacokinetic or pharmacodynamic parameters, which may include clinical effects such as toxic effects and/or laboratory values. Thus, the present invention encompasses intra-patient dose-escalation as determined by the skilled artisan. Determining appropriate dosages and regiments for administration of the chemotherapeutic agent are well-known in the relevant art and would be understood to be encompassed by the skilled artisan once provided the teachings disclosed herein.

The effectiveness of the dosage forms of this invention may be tested for example, by methods known to those skilled in the art including in vitro dissolution tests as provided herein and clinical trials as described below.

A randomized, open-label, single dose, four way crossover study comparing modified release formulations of apixaban tablets to apixaban immediate release tablets in healthy volunteers may be used to assess for example, the bioavailability of the modified-release dosage forms.

To provide alternative dosing options, modified release formulations of apixaban were evaluated to achieve lower peak to trough plasma apixaban concentration fluctuations when compared to an immediate release (IR) tablet. For example, to assess the feasibility of modified release formulations, three prototype formulations (MR1, MR2, and MR3) with different release characteristics were studied.

The study was a randomized, open-label, single-dose, 4-period, 4-sequence, 4-way crossover study in appropriately healthy men and/or women subjects.

| Sequence | Period 1 | Period 2 | Period 3 | Period 4 |
|---|---|---|---|---|
| 1 | IR Tablets | MR3 Tablet | MR1 Tablet | MR2 Tablet |
| 2 | MR1 Tablet | IR Tablets | MR2 Tablet | MR3 Tablet |
| 3 | MR2 Tablet | MR1 Tablet | MR3 Tablet | IR Tablets |
| 4 | MR3 Tablet | MR2 Tablet | IR Tablets | MR1 Tablet |

The subjects were randomized to one of four sequences of four treatment periods depicted in the table above. Each sequence consisted of the following 4 treatments: apixaban IR, apixaban MR1, apixaban MR2, and apixaban MR3. Study treatments were separated by a washout period. Pharmacokinetic and safety assessments were conducted during each treatment period. Plasma concentrations of apixaban were measured using validated methods. Pharmacokinetic parameters such as $C_{max}$, $C_{24}$, $T_{max}$, AUCinf, $AUC_{last}$, and $t\frac{1}{2}$ were estimated from plasma concentration-time data using standard noncompartmental methods. The data from this study can be used to assess the modified release formulations and prepare alternative formulations.

A clinical study was performed according to the above description. The immediate release formulation is generally described in Example 7. The MR1 formulation included a non-solubility enhanced form of apixaban. The MR2 and MR3 formulations were solubility enhanced forms of apixaban in a controlled release formulation. MR2 is exemplified in Example 2 and MR3 is exemplified in Example 1. The MR2 and MR3 tablets (osmotic formulations with release durations of 5-6 hr, and 10 hr, respectively) resulted in decreased $C_{max}$ and reduced relative bioavailability, compared to the IR formulation. The magnitude of decrease in apixaban absorption appeared to be related to the release profiles of the formulations tested. Relative bioavailability of the 2 test 10 mg MR2 and MR3 tablet formulations compared to the 2×5 mg IR tablets was approximately 66%, and 50% for the MR2, and MR3 tablet formulations, respectively. Based on ratios (test/reference) of adjusted geometric mean Cmax values, peak exposure for the MR2, and MR3 test formulations was 44%, and 21%, respectively, of that for the reference tablets.

Figure 8:
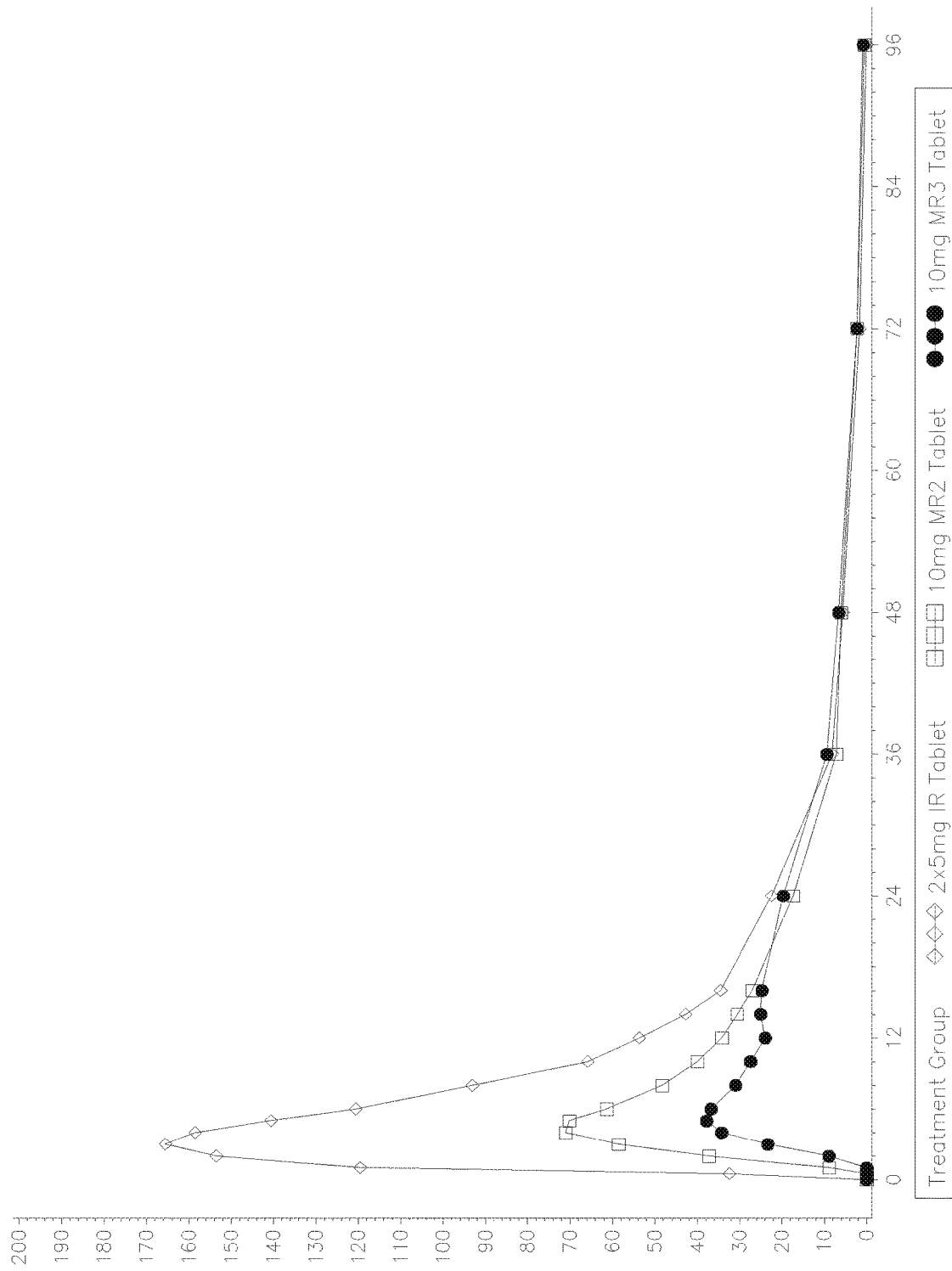
FIG. 8 is a graph of median plasma apixaban concentration-time profiles following single oral doses for different formulations of apixaban.

Median plasma apixaban concentration-time profiles following single oral doses for the immediate release, the MR2 and MR3 formulations are presented in FIG. 8. In the linear graph nominal time post dose (hours) X axis is graphed against plasma concentration (ng/ml) Y axis.

PK parameters are summarized descriptively in Table 1 and the statistical comparisons are summarized in Table 2. Total exposures of apixaban following administration of the MR2 and MR3 tablets, based on mean apixaban $AUC_{inf}$, were approximately 66%, and 50% relative to the IR tablets, respectively. The mean apixaban $C_{max}$ values following administration of the MR2, and MR3 tablets were 44%, and 21% of that following the IR tablets, respectively. Median $T_{max}$ value for the IR tablet was 3 hours, while median $T_{max}$ values for the MR2 and MR3 tablets were 5 and 6 hours, respectively. Apparent $t\frac{1}{2}$ for the IR tablets had a mean value of approximately 14 hours; mean $t\frac{1}{2}$ values for the MR2 and MR3 were approximately 20 hours. C24 values across all treatments were similar.

Variability for $C_{max}$ and $AUC_{inf}$ based on % CV was generally similar for the standard and the MR2 and MR3 formulations. Variability (CV %) for C24 was slightly higher for the reference tablets (41%) than for the MR2 and MR3 tablets (26-34%).

Figure 9:
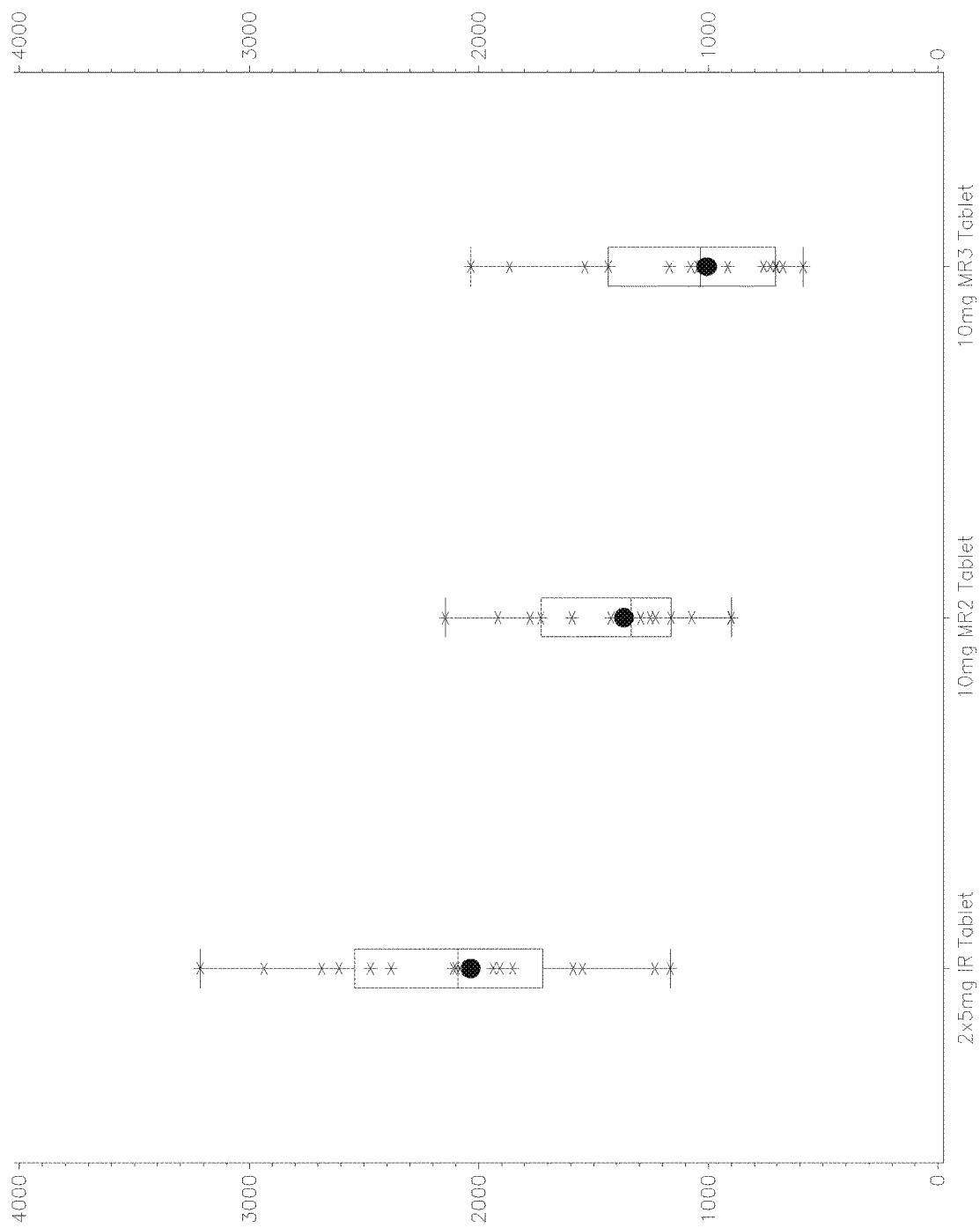
FIG. 9 is a graph of individual and geometric mean plasma Apixaban AUCinf values following administration of different formulations of apixaban.
Figure 10:
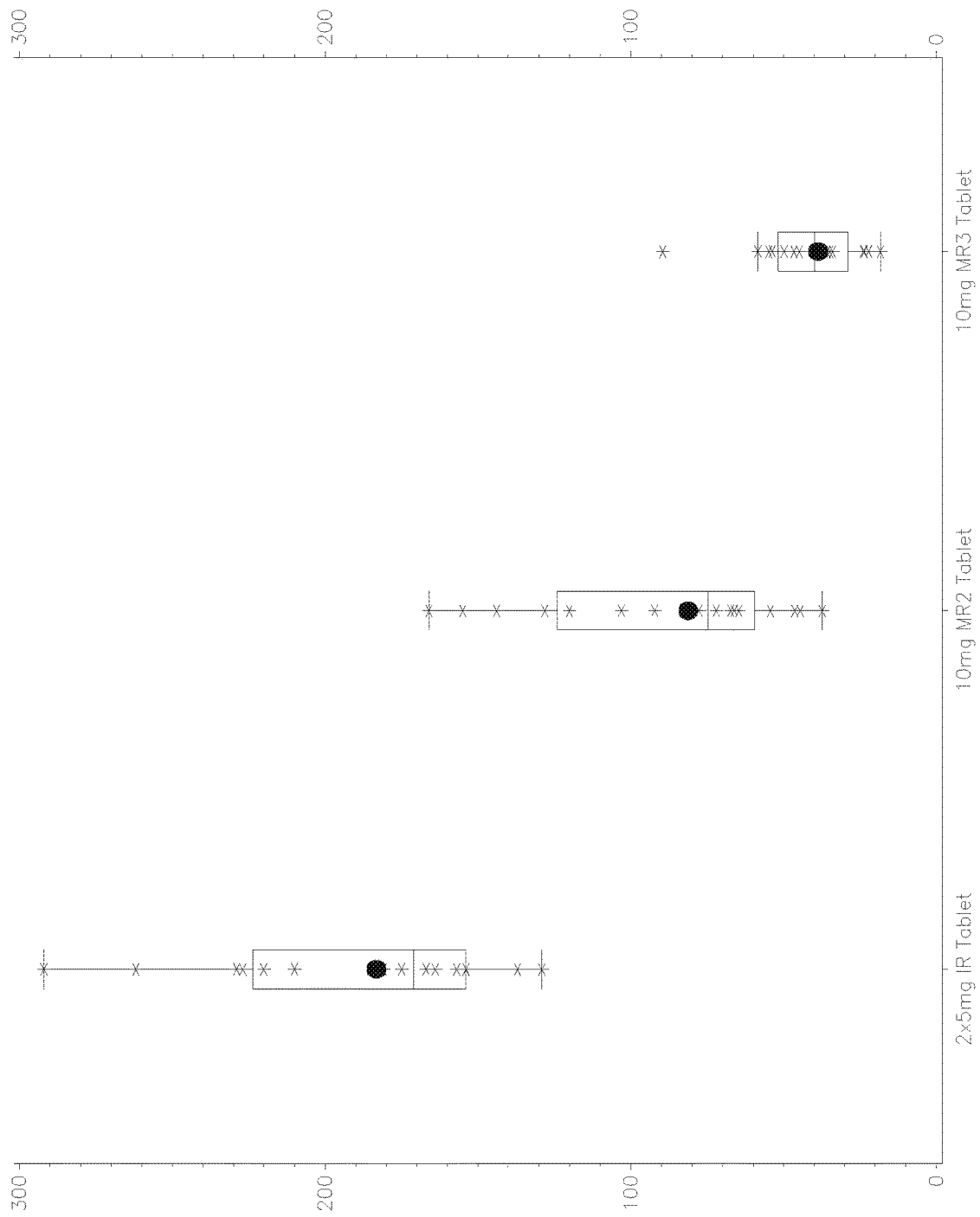
FIG. 10 is a graph of individual and geometric mean plasma Cmax values following administration of different formulations of apixaban.

Individual and geometric mean plasma Apixaban AUCinf and Cmax values are presented graphically in FIGS. 9 and 10 respectively. The FIG. 9 AUCinf graph has Treatment group X axis graphed against AUCinf (ng·hr/mL) Y axis. The FIG. 10 Cmax graph has Treatment group X axis graphed against Cmax (ng/mL) Y axis. The circles represent the geometric mean and the stars represent individual values. The "box" plot provides median and 25%/75% quartiles with whiskers to the last point within 1.5 times interquartile range.

TABLE 1

Summary of Plasma Apixaban Pharmacokinetic Parameter Values Following Single Oral Doses

| | Parameter Summary Statistics[a] by Treatment | | |
|---|---|---|---|
| Parameter, Units | 2 × 5 mg IR Tablet | 10 mg MR2 Tablet | 10 mg MR3 Tablet |
| N, n[b] | 16, 16 | 16, 14 | 16, 15 |
| $AUC_{inf}$, ng * hr/mL | 2035 (27) | 1367 (27) | 1008 (41) |
| $AUC_{last}$, ng * hr/mL | 2000 (28) | 1233 (29) | 943 (37) |
| $C_{24}$, ng/mL | 19.6 (41) | 17.5 (27) | 19.1 (26) |
| $C_{max}$, ng/mL | 183 (25) | 81.3 (46) | 38.5 (42) |
| $T_{max}$, hr | 3.00 (1.98-5.00) | 5.00 (2.00-6.00) | 6.00 (4.00-16.00) |
| $t\frac{1}{2}$, hr | 14.3 (40) | 20.6 (69) | 19.7 (50) |

IR = immediate release formulation;
MR2 = modified release 2 formulation (5-6 hours);
MR3 = modified release 3 formulation (10 hours)
[a]Geometric mean (% CV) for all except: median (range) for $T_{max}$; arithmetic mean (% CV) for $t\frac{1}{2}$.
[b]N = Number of subjects in the treatment group;
n = number of subjects where $t\frac{1}{2}$ and AUCinf were determined.

TABLE 2

Statistical Summary of Treatment Comparisons

| Parameter (units) | Adjusted Geometric Means Test | Adjusted Geometric Means Reference | Ratio (Test/ Reference) of Adjusted Means[a] | 90% CI for Ratio |
|---|---|---|---|---|
| 10 mg MR2 Tablet (Test) vs. 2 × 5 mg IR Tablet (Reference) | | | | |
| $AUC_{inf}$ (ng * hr/mL) | 1336.91 | 2035.19 | 65.69 | (58.09, 74.28) |
| $AUC_{last}$ (ng * hr/mL) | 1232.67 | 2000.77 | 61.60 | (55.00, 69.02) |
| $C_{24}$ (ng/mL) | 17.46 | 19.61 | 89.04 | (77.96, 101.70) |
| $C_{max}$ (ng/mL) | 81.27 | 183.24 | 44.35 | (37.12, 52.99) |
| 10 mg MR3 Tablet (Test) vs. 2 × 5 mg IR Tablet (Reference) | | | | |
| $AUC_{inf}$ (ng * hr/mL) | 1020.94 | 2035.19 | 50.16 | (44.49, 56.66) |
| $AUC_{last}$ (ng * hr/mL) | 943.07 | 2000.77 | 47.14 | (42.08, 52.80) |
| $C_{24}$ (ng/mL) | 19.11 | 19.61 | 97.47 | (85.34, 111.33) |
| $C_{max}$ (ng/mL) | 38.54 | 183.24 | 21.03 | (17.60, 25.13) |

CI = confidence interval,
IR = immediate release formulation;
MR2 = modified release 2 formulation (5-6 hours);
MR3 = modified release 3 formulation (10 hours)
[a]The ratios (and 90% CIs) are expressed as percentages.

Other features and embodiments of the invention will become apparent from the following examples, which are given for illustration of the invention rather than for limiting its intended scope.

Example 1

This example demonstrates a dosage form of the invention that provides controlled-release delivery of a solubility-improved form of apixaban.

Formation of the Solubility-Improved Form of Apixaban

A solubility-improved from of apixaban was prepared by forming a solid amorphous dispersion of apixaban in hydroxypropyl methyl cellulose acetate succinate-HG (HPMCAS). The HPMCAS-HG grade (AQOAT-HG) manufactured by Shin Etsu, Tokyo, Japan (the "G" standing for granular) provides enteric protection up to a pH of about 6.8. The dispersion was prepared by spray-drying a solution containing 0.5 wt % apixaban, 1.5 wt % HPMCAS-HG, 93.1% tetrahydrofuran and 4.9 wt % purified water. The solution was spray-dried using a pressure spray nozzle (Spray Systems SK 78-16) at an atomization pressure of (270 psig) with a liquid feed rate of about 163±10 g/min into the stainless steel chamber of a Niro PSD-1 spray-dryer maintained at a temperature of about 117° C.±10° C. at the inlet and about 45° C.±5° C. at the outlet. The PSD-1 was equipped with 9-ilnch and 6-foot chamber extensions. Secondary drying was performed using an ES2000 Mini Tray Dryer (Environmental Specialties, Raleigh, N.C.) with a drying bed temperature of 40° C.±5° C., and a drying time of 16 hours.

An in vitro dissolution test was performed to demonstrate that the solid amorphous dispersion of Example 1 is a solubility-improved form of apixaban. For this test, a sufficient amount of material was added to a microcentrifuge test tube so that the concentration of apixaban would have been 1000 μg/mL, if all of the drug had dissolved. The test was run in duplicate. The tubes were placed in a 37° C. temperature-controlled chamber, and 1.8 mL PBS containing 7.3 mM sodium taurocholic acid and 1.4 mM 1 palmitoyl-2-oleyl-sn-glycero-3-phosphocholine (model fasted duodenal (MFD) solution) at pH 6.5 and 290 mOsm/kg was added to each respective tube. The samples were quickly mixed using a vortex mixer for about 60 seconds. The samples were centrifuged at 13,000 G at 37° C. for 1 minute. The resulting supernatant solution was then sampled and diluted 1:6 (by volume) with methanol and then analyzed by high-performance liquid chromatography (HPLC). HPLC analysis was performed using a Zorbax SB C8 column. The mobile phase consisted of 60% 30-mM ammonium acetate, and 40% acetonitrile. UV absorbance was measured at 280 nm. The contents of each tube were mixed on the vortex mixer and allowed to stand undisturbed at 37° C. until the next sample was taken. Samples were collected at 4, 10, 20, 40, 90, and 1200 minutes.

As a control, crystalline apixaban alone was evaluated using the same procedure. A sufficient amount of material was added so that the concentration of apixaban would have been 1000 μg/m L, if all of drug had dissolved.

The concentrations of apixaban obtained in these samples were used to determine the maximum dissolved concentration of apixaban in solution during the first ninety minutes of the test ($MDC_{90}$), the area under the concentration-versus-time curve during the initial ninety minutes ("$AUC_{90}$"), and the concentration of apixaban at 1200 minutes ("$C_{1200}$"). The results are shown in Table 3.

TABLE 3

| Sample | $MDC_{90}$ (μg/mL) | $AUC_{90}$ (min * μg/mL) | $C_{1200}$ (μg/mL) |
|---|---|---|---|
| Example 1 | 950 | 220,000 | 660 |
| Crystalline apixaban | 60 | 5000 | 50 |

Controlled-Release Apixaban Composition

A bilayer osmotic controlled-release device was formed from the solubility-improved form of apixaban as follows. Quantities are provided as quantity per unit (mg). 237.6 mg PolyOx WSR-N80 (Dow) and 118.4 mg xylitol (trade name XYLITAB 200) were combined and blended. The blended material was passed through a Comil 197 equipped with a 0.032 inch (032R) screen and de-lumped the excipients at a low speed (approximately 1000 rpm). The resulting material was discharged into a blender and 40 mg apixaban solid amorphous dispersion (apixaban:HPMCAS-HG) was layered into the blender and mixed at 12 RPM for approx. 15 minutes. 2 mg of magnesium stearate was added to the blender and mixed at 12 RPM for approx. 5 minutes. The blend was roll compacted (Gerteis Minipactor) to a solid fraction of about 0.72. The resulting granules were transferred to a blender and 2 mg magnesium stearate was added and to the blender and mixed at 12 RPM for approx. 15 minutes. Sodium powder was de-lumped in a Comil 197 equipped with a 0.032 inch (032R) round hole screen and a model 1601 impeller at approximately 1000 RPM. 129 mg PEO WSR Coagulant (Dow), 51.6 mg Avicel PH 200 (FMC), 17.2 mg sodium chloride, 0.6 mg FD&C #2 Blue Lake were transferred to a separate (second) blender and mixed at 12 RPM for approx. 15 minutes. 1 mg magnesium stearate was added to the separate (second) blender and mixed at 12 RPM for approx. 15 minutes to form the swellable layer.

Tablet cores were formed by compressing 600 mg (400 mg amorphous dispersion apixaban layer; 200 mg swellable layer) using a rotary tri-layer press (Elizabeth-HATA AP-55). Feed hopper #1 was filled with the amorphous dispersion apixaban layer, feed hopper #2 was empty and feed hopper #3 was filled with the swellable layer. A tamp force of 50-65 kg was used for the amorphous dispersion apixaban layer and the tamp force of 500-600 kg was used after hopper #3 and the final compression force was approx. 14 kN resulting in tablets of approx. 15 kP hardness.

Extended Duration Coating

A water-permeable coating was applied to the core using a Vector LDCS-20 pan coater with a Schlick 970 Vector Hybrid anti-bearding nozzle. The coating solution was prepared at 4-wt % solids. 8.0 mg/g polyethylene glycol (PEG 3350, Union Carbide) was dissolved in 40.0 mg/g water and 920 mg/g acetone was added to the PEG/water solution. 32.0 mg/g cellulose acetate (CA 398-10 from Eastman Fine Chemical, Kingsport, Tenn.) was added to the stirring solution and the resulting solution was mixed until homogeneous. Alternatively stated, 9.6 mg/tablet polyethylene glycol (PEG 3350, Union Carbide) was dissolved in 48 mg/tablet water and 1104 mg/tablet acetone was added to the PEG/water solution. 38.4 mg/tablet cellulose acetate (CA 398-10 from Eastman Fine Chemical, Kingsport, Tenn.) was added to the stirring solution and the resulting solution was mixed until homogeneous.

The coating solution was applied at a rate of 20 g/min with the outlet temperature set at 37° C.±1° C. Nitrogen at 10 psig was used to atomize the coating solution from the spray nozzle, with a nozzle-to-bed distance of 2.5 inches. Pattern air was set at 5 psi. The pan rotation was set to 22±1 rpm. The so-coated tablets were dried at 40° C. in a convection oven removing essentially all of the acetone and water. The final dry coating weight (48 mg/unit) amounted to 8 wt % of the tablet core, and consisted of about 38.4 mg of CA, and 9.6 mg PEG 3350. One 1200 μm diameter hole was then laser-drilled in the coating on the drug-containing composition side of the tablet to provide 1 delivery port per tablet.

In Vitro Dissolution Tests

In vitro tests were performed to measure the release of apixaban from the dosage form of Example 1. To perform an in vitro dissolution test, each dosage form was first placed into a stirred USP type 2 dissoette flask containing 900 mL of a buffer solution simulating the contents of the intestine (200 mM NaH$_2$PO$_4$, pH 6.8 and 0.5% SLS). The solutions were stirred using paddles rotating at a rate of 75 rpm. Samples were taken at periodic intervals using an autosampling dissoette device programmed to periodically remove a sample of the receptor solution. The drug concentrations were analyzed by HPLC using a Waters XBridge Shield RP18 column, and a mobile phase of 60/40 (vol. %) acetonitrile/30 mM ammonium acetate. UV absorption was measured at 280 nm. Results are shown in Table 4.

TABLE 4

| Time (hours) | apixaban (wt % released) |
| --- | --- |
| 0 | 0 |
| 1 | 0 |
| 2 | 6 |
| 3 | 16 |
| 4 | 27 |
| 5 | 38 |
| 6 | 48 |
| 8 | 65 |

TABLE 4-continued

| Time (hours) | apixaban (wt % released) |
| --- | --- |
| 10 | 80 |
| 12 | 90 |
| 20 | 96 |

The data show that the dosage form of Example 1 provided controlled release of apixaban, with the time to release 80 wt % of the drug from the dosage form being about 10 hours. The dosage form released Apixaban at an average rate of about 9 wt %/hr during the first 10 hours following administration to the test medium.

Example 2

This example demonstrates a second dosage form of the invention that provides controlled-release delivery of apixaban. Apixaban was in the form of a solid amorphous dispersion, made as described in Example 1. A bilayer osmotic tablet core containing the solid amorphous dispersion was also prepared as described in Example 1.

Short Duration Coating

A water-permeable coating was applied to the core using a Vector LDCS-20 pan coater with a Schlick 970 Vector Hybrid anti-bearding nozzle. The coating solution given as 4-wt % total solids. 16.0 mg/g polyethylene glycol (PEG 3350, Union Carbide) was dissolved in 40.0 mg/g water and 920 mg/g acetone was added to the PEG/water solution. 24.0 mg/g cellulose acetate (CA 398-10 from Eastman Fine Chemical, Kingsport, Tenn.) was added to the stirring solution and the resulting solution was mixed until homogeneous. Alternatively stated, 24 mg/tablet polyethylene glycol (PEG 3350, Union Carbide) was dissolved in 60 mg/tablet water and 1440 mg/tablet acetone was added to the PEG/water solution. 36 mg/tablet cellulose acetate (CA 398-10 from Eastman Fine Chemical, Kingsport, Tenn.) was added to the stirring solution and the resulting solution was mixed until homogeneous. The coating solution was applied at a flow rate of 20 g/min with the outlet temperature set at 37° C.±1° C. Nitrogen at 10 psi was used to atomize the coating solution from the spray nozzle, with a nozzle-to-bed distance of 2.5 inches. Pattern air was set at 5 psi. The pan rotation was set to 22±1 rpm. The so-coated tablets were dried at 40° C. in a convection oven removing essentially all of the acetone and water. The final dry coating weight (60 mg) amounted to 10 wt % of the tablet core, and consisted of about 36 mg of CA, and 24 mg PEG 3350. One 1200 μm diameter hole was then laser-drilled in the coating on the drug-containing composition side of the tablet to provide 1 delivery port per tablet.

In Vitro Dissolution results are shown in Table 5.

TABLE 5

| Time (hours) | apixaban (wt % released) |
| --- | --- |
| 0.0 | 0.0 |
| 1.0 | 5.0 |
| 2.0 | 24.0 |
| 3.0 | 43.0 |
| 4.0 | 60.0 |
| 5.0 | 72.0 |
| 6.0 | 83.0 |

TABLE 5-continued

| Time (hours) | apixaban (wt % released) |
|---|---|
| 8.0 | 94.0 |
| 10.0 | 96.0 |
| 12.0 | 97.0 |
| 20.0 | 97.0 |

The data show that the dosage form of Example 2 provided controlled release of apixaban, with the time to release 80 wt % of the drug from the dosage form being about 6 hours. The dosage form released apixaban at an average rate of about 16 wt %/hr during the first 6 hours following administration to the test medium.

Examples 3-6

Solubility-improved forms of apixaban were prepared by forming solid amorphous dispersions of apixaban using various polymers and at various drug loadings. Examples 3-5 were spray-dried using the "M" grade of HPMCAS (AQOAT-MG manufactured by Shin Etsu, which provides enteric protection up to pH 6.0). Example 6 was spray-dried using hydroxypropyl methyl cellulose (HPMC E3 Prem, Dow Chemical Company, Midland, Mich.). Examples 3 through 6 were spray dried using a small-scale spray drier. Table 6 shows the spray solution compositions.

TABLE 6

| Example | Drug Loading (wt %) | Spray Solution Composition (g) | | |
|---|---|---|---|---|
| | | Apixaban | Polymer | Solvent |
| 3 | 10 | 0.75 | 6.75 (HPMCAS-MG) | 143.5 (9/1 THF/water) |
| 4 | 25 | 0.75 | 2.25 (HPMCAS-MG) | 72.0 (9/1 THF/water) |
| 5 | 50 | 0.75 | 0.75 (HPMCAS-MG) | 73.5 (9/1 THF/water) |
| 6 | 25 | 0.75 | 2.25 (HPMC) | 75.0 (9/1 THF/water) |

An in vitro dissolution test was performed to demonstrate that the solid amorphous dispersions of Examples 3 through 6 provide concentration-enhancement of apixaban. The test was performed as described above for Example 1, except that the dispersions were added to microcentrifuge tubes as an aqueous suspension vehicle containing 0.5 wt % Methocel A (Dow Chemical Company). A sufficient amount of dispersion was added to a 0.5 wt % Methocel A solution to obtain a 10 mgA/mL suspension, and 90 μL of suspension was added to a microcentrifuge test tube so that the concentration of apixaban would have been 500 μg/mL, if all of the drug had dissolved. MFD solution was added as described for Example 1. As a control, crystalline apixaban alone was evaluated using the same procedure.

The concentrations of apixaban obtained in these samples were used to determine the $MDC_{90}$, the $AUC_{90}$, and $C_{1200}$. The results are shown in Table 7.

TABLE 7

| Example | $MDC_{90}$ (μg/mL) | $AUC_{90}$ (min * μg/mL) | $C_{1200}$ (μg/mL) |
|---|---|---|---|
| 3 | 490 | 42,000 | 480 |
| 4 | 480 | 41,200 | 470 |

TABLE 7-continued

| Example | $MDC_{90}$ (μg/mL) | $AUC_{90}$ (min * μg/mL) | $C_{1200}$ (μg/mL) |
|---|---|---|---|
| 5 | 450 | 39,300 | 440 |
| 6 | 500 | 43,200 | 500 |
| Crystalline apixaban | 60 | 3,700 | 40 |

The results show that the solid amorphous dispersions of Examples 3 through 6 are solubility-improved forms relative to crystalline apixaban alone. $MDC_{90}$ values were 7.5- to 8.3-fold that provided by crystalline apixaban, and $AUC_{90}$ values were 10.6- to 11.7-fold that provided by crystalline apixaban. The data also show that the concentration of dissolved apixaban after 1200 hours ($C_{1200}$) was 11- to 12.5-fold that provided by crystalline apixaban.

Example 7

An immediate release tablet containing 5 mg apixaban was generally prepared as follows:

The raw materials described in Table 8 (below) were blended prior to granulation. The blended raw materials were granulated using a dry granulation process. Then the dry granulated materials were blended with the extragranular materials. The blended materials were compressed into tablets and film coated with a conventional coating for "cosmetic" purposes.

TABLE 8

| | 5 mg Pill Tablet (5 mg/tab) |
|---|---|
| Intragranular | |
| Apixaban | 5.00 |
| Lactose anhydrous | 100.50 |
| Microcrystalline cellulose | 82.00 |
| Croscarmellose sodium | 4.00 |
| Sodium lauryl sulfate | 2.00 |
| Magnesium stearate | 1.00 |
| Extragranular | |
| Croscarmellose sodium | 4.00 |
| Magnesium stearate | 1.50 |
| Total Core Tablet | |
| Film Coat | 7.00 |
| Total Tablet Weight | |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A composition comprising apixaban and a polymer, wherein the apixaban comprises amorphous apixaban, wherein the composition comprises a solid amorphous dispersion comprising the amorphous apixaban and the polymer, and wherein the solid amorphous dispersion is a spray-dried dispersion.

2. The composition of claim 1, wherein the solid amorphous dispersion is substantially homogeneous.

3. The composition of claim 1, wherein the amorphous apixaban constitutes at least 60 wt % of the apixaban in the composition.

4. The composition of claim 1, wherein a content of the amorphous apixaban in the solid amorphous dispersion is about 1 wt % to about 80 wt %.

5. The composition of claim 1, wherein the solid amorphous dispersion has a single glass transition temperature ($T_g$).

6. The composition of claim 1, wherein the polymer has a $T_g$ of at least 40° C.

7. The composition of claim 1, comprising 1 mg to 10 mg of the apixaban.

8. The composition of claim 7, which is a tablet.

9. The composition of claim 7, which is a capsule.

10. The composition of claim 1, comprising 1 mg to 5 mg of the apixaban.

11. The composition of claim 10, which is a tablet.

12. The composition of claim 10, which is a capsule.

13. The composition of claim 1, comprising 5 mg to 10 mg of the apixaban.

14. The composition of claim 13, which is a tablet.

15. The composition of claim 13, which is a capsule.

16. The composition of claim 1, comprising 5 mg of the apixaban.

17. The composition of claim 16, which is a tablet.

18. The composition of claim 16, which is a capsule.

19. The composition of claim 1, comprising 10 mg of the apixaban.

20. The composition of claim 19, which is a tablet.

21. The composition of claim 19, which is a capsule.

22. The composition of claim 1, wherein the polymer is an amphiphilic polymer.

23. The composition of claim 22, wherein the amphiphilic polymer comprises a cellulosic polymer.

24. The composition of claim 1, wherein the polymer is an ionizable polymer.

25. The composition of claim 1, wherein the polymer comprises a cellulosic polymer.

26. The composition of claim 25, wherein the cellulosic polymer is an ionizable cellulosic polymer.

27. The composition of claim 25, wherein the cellulosic polymer is selected from the group consisting of hydroxypropyl methyl cellulose acetate succinate, hydroxypropyl methyl cellulose succinate, hydroxypropyl cellulose acetate succinate, hydroxyethyl methyl cellulose succinate, hydroxyethyl cellulose acetate succinate, hydroxypropyl methyl cellulose phthalate, hydroxyethyl methyl cellulose acetate succinate, hydroxyethyl methyl cellulose acetate phthalate, carboxyethyl cellulose, ethyl carboxymethyl cellulose, carboxymethyl cellulose, methyl cellulose acetate phthalate, ethyl cellulose acetate phthalate, hydroxypropyl cellulose acetate phthalate, hydroxypropyl methyl cellulose acetate phthalate, hydroxypropyl cellulose acetate phthalate succinate, hydroxypropyl methyl cellulose acetate succinate phthalate, hydroxypropyl methyl cellulose succinate phthalate, cellulose propionate phthalate, hydroxypropyl cellulose butyrate phthalate, cellulose acetate trimellitate, methyl cellulose acetate trimellitate, ethyl cellulose acetate trimellitate, hydroxypropyl cellulose acetate trimellitate, hydroxypropyl methyl cellulose acetate trimellitate, hydroxypropyl cellulose acetate trimellitate succinate, cellulose propionate trimellitate, cellulose butyrate trimellitate, cellulose acetate terephthalate, cellulose acetate isophthalate, cellulose acetate pyridinedicarboxylate, salicylic acid cellulose acetate, hydroxypropyl salicylic acid cellulose acetate, ethylbenzoic acid cellulose acetate, hydroxypropyl ethylbenzoic acid cellulose acetate, ethyl phthalic acid cellulose acetate, ethyl nicotinic acid cellulose acetate, and ethyl picolinic acid cellulose acetate.

28. The composition of claim 25, wherein the cellulosic polymer is a neutral cellulosic polymer.

29. The composition of claim 25, wherein the cellulosic polymer is selected from the group consisting of hydroxypropyl methyl cellulose acetate, hydroxypropyl methyl cellulose, hydroxypropyl cellulose, methyl cellulose, hydroxyethyl methyl cellulose, hydroxyethyl cellulose acetate, and hydroxyethyl ethyl cellulose.

30. The composition of claim 1, wherein the polymer comprises an ionizable, non-cellulosic polymer.

31. The composition of claim 1, wherein the polymer comprises a carboxylic acid functionalized polymer.

32. The composition of claim 1, wherein the polymer is selected from the group consisting of a carboxylic acid functionalized polymethacrylate, a carboxylic acid functionalized polyacrylate, an amine-functionalized polyacrylate, an amine-functionalized polymethacrylate, and a carboxylic acid functionalized starch.

33. The composition of claim 32, wherein the polymer is starch glycolate.

34. The composition of claim 1, wherein the polymer comprises a neutral, non-cellulosic polymer.

35. The composition of claim 1, wherein the polymer comprises a neutralized acidic polymer.

36. The composition of claim 1, wherein the solid amorphous dispersion is granulated.

37. The composition of claim 1, which is a tablet.

38. The composition of claim 1, which is a capsule.

39. The composition of claim 38, wherein the polymer is hydroxypropyl methyl cellulose.

40. The composition according to claim 39, wherein the composition comprises up to 5 mg of the apixaban.

41. The composition according to claim 40, wherein the amorphous apixaban constitutes at least 60 wt % of the apixaban in the composition.

* * * * *